(12) United States Patent
Atef

(10) Patent No.: US 12,008,621 B1
(45) Date of Patent: Jun. 11, 2024

(54) SEARCH QUERY PROCESSING SYSTEM

(71) Applicant: InstaProtek Inc., Irvine, CA (US)

(72) Inventor: Farsheed Atef, Lake Forest, CA (US)

(73) Assignee: InstaProtek Inc., Irvine, CA (US)

( * ) Notice: Subject to any disclaimer, the term of this patent is extended or adjusted under 35 U.S.C. 154(b) by 0 days.

(21) Appl. No.: 18/328,681

(22) Filed: Jun. 2, 2023

(51) Int. Cl.
*G06Q 30/0601* (2023.01)
*G06F 40/30* (2020.01)
*G06Q 30/0282* (2023.01)

(52) U.S. Cl.
CPC ..... *G06Q 30/0625* (2013.01); *G06Q 30/0282* (2013.01); *G06Q 30/0639* (2013.01); *G06F 40/30* (2020.01)

(58) Field of Classification Search
CPC .... G06Q 30/0601–0643; G06F 16/951; G06F 16/953; G06F 16/9532; G06F 16/9035; G06F 16/9038; G06F 16/907; G06F 16/908; G06F 16/9535; G06F 16/9536; G06F 16/9538; G06F 40/20; G06F 40/30
See application file for complete search history.

(56) References Cited

U.S. PATENT DOCUMENTS

| | | | |
|---|---|---|---|
| 6,931,528 B1 | 8/2005 | Lmmonen | |
| 11,599,927 B1 * | 3/2023 | Flunkert | G06N 3/0442 |
| 2006/0276184 A1 | 12/2006 | Tretyak | |
| 2007/0061069 A1 | 3/2007 | Christensen | |
| 2009/0012704 A1 | 1/2009 | Franco | |
| 2010/0057308 A1 | 3/2010 | Hill | |
| 2012/0219142 A1 | 8/2012 | Gould | |
| 2014/0099973 A1 | 4/2014 | Cecchini | |
| 2016/0210614 A1 | 7/2016 | Hall | |
| 2017/0085530 A1 | 3/2017 | Volkov | |
| 2017/0124575 A1 * | 5/2017 | Clark | G06F 16/24578 |
| 2017/0232975 A1 | 8/2017 | Burk | |

(Continued)

OTHER PUBLICATIONS

Comparative experiments on sentiment classification for online product reviews. Authors: Hang Cui, Vibhu Mittal, Mayur Datar. AAAI'06: proceedings of the 21st national conference on Artificial intelligence—vol. 2. Jul. 16, 2006. pp. 1265-1270 (Year: 2006).*

(Continued)

*Primary Examiner* — William J Allen
(74) *Attorney, Agent, or Firm* — Knobbe, Martens, Olson & Bear LLP

(57) ABSTRACT

Systems and methods for enhanced search query systems and methods are described. A large language model is used to extract metadata from a plurality of items of content related to respective items. Sentiment analysis is utilized to determine user sentiment regarding respective item attributes and/or items. Values are associated with a given item's attributes using the determined user sentiment. A user query is received over a network. A search is performed for items satisfying the query using the extracted metadata. Items identified in the search may be ranked using respective values, the values based at least in part on the determined user sentiment, assigned to respective attributes associated with the items. The ranked search results may be transmitted to the user device, the ranked search results corresponding at least in part to the item and/or item attribute rankings, wherein the ranked search results are displayed via the user device.

20 Claims, 26 Drawing Sheets

(56) References Cited

U.S. PATENT DOCUMENTS

| | | | |
|---|---|---|---|
| 2017/0363437 A1 | 12/2017 | Baracco et al. | |
| 2019/0095973 A1* | 3/2019 | Byron | G06Q 30/0282 |
| 2019/0318407 A1* | 10/2019 | Giridhari | G06Q 30/0627 |
| 2020/0104896 A1 | 4/2020 | Bleakley | |
| 2020/0401646 A1 | 12/2020 | Brunet et al. | |
| 2021/0157311 A1 | 5/2021 | Marakkannu et al. | |
| 2021/0241036 A1* | 8/2021 | Benkreira | G06N 3/084 |
| 2021/0293943 A1 | 9/2021 | Komiyama | |
| 2022/0157167 A1 | 5/2022 | Gupta et al. | |
| 2022/0178706 A1 | 6/2022 | Okuda et al. | |
| 2022/0187848 A1 | 6/2022 | Morfitt et al. | |
| 2022/0196412 A1 | 6/2022 | Lee | |
| 2022/0206677 A1 | 6/2022 | Zadina et al. | |
| 2023/0040315 A1* | 2/2023 | Gupta | G06F 16/338 |

OTHER PUBLICATIONS

Blake-Wilson, Simon, et al. Elliptic curve cryptography (ECC) cipher suites for transport layer security (TLS). No. rfc4492. 2006. (Year: 2006).

Chumkamon, Sakmongkon, Peranitti Tuvaphanthaphiphat, and Phongsak Keeratiwintakorn, "A blind navigation system using RFID for indoor environments," 2008 5$^{th}$ International Conference on Electrical Engineering/Electronics, Computer, Telecommunications and Information Technology, vol. 2, IEEE, 2008 (Year: 2008).

\* cited by examiner

SEARCH QUERY PROCESSING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to search query processing.

Description of the Related Art

Conventional search systems often fail to to identify sufficiently relevant data in response to a search query. Further, conventionally the ranking of the search results may not sufficiently reflect the relevancy of search results to the search query.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a navigation system configured to use GPS or Wi-Fi to navigate users within a structure as well as on roadways. Optionally, two or more sources of position data may be utilized (e.g., both GPS data and Wi-Fi triangulation data) to enhance positioning accuracy and to enhance reliability. A mapping system may be configured to generate maps and transmit the maps to user devices in association with turn-by-turn instructions. A given user's current position may be monitored and corrective navigation instructions may be provided. A given user may be navigated to a position of a second user.

An aspect of the disclosure relates to a navigation system configured to detect that a first user is at a structure using data received from a first device. A query regarding an item is received via the first device. An item location within the structure is determined. A first location of the first user at the structure is determined. A first navigation route is generated from the first location of the first user to the item location within the structure. The first navigation route is transmitted to the first device in association with at least a portion of a map of a layout of the structure. A request is received from the first device. In response to the request, a second navigation route is generated from a location of a second user to the item location. The second navigation route is transmitted to a second device in association with at least a portion of the map of the layout of the structure.

An aspect of the present disclosure relates to a navigation system configured to perform roadway navigation and establishment layout navigation, the system comprising: a network interface; at least one processing device operable to perform operations comprising: receive, via the network interface over a network from a first user device, associated with a first user, a first query regarding a first item; perform a search for establishments satisfying the first query; provide search results comprising establishments satisfying the first query to the first user device associated with the first user; receive a first user selection of a first establishment from the search results; determine a first current location of the first user; generate a roadway navigation route from the first current location of the first user to the first establishment; cause the roadway generated navigation route to be transmitted to the first user device and to be displayed in association with a roadway map; detect that the first user is at the first establishment; determine a second current location of the first user, the second current location at the first establishment; determine a location of the first item within the first establishment; generate a first layout navigation route from the second current location of the first user to the location of the first item within the first establishment; cause the first layout navigation route from the second current location of the first user to the location of the first item within the first establishment to be transmitted to and displayed by the first user device in association with at least one portion of a map of a layout of the first establishment; receive a first request from the first user via the first user device; at least partly in response to the first request from the first user, generate a second layout navigation route from a first current location of a second user to the location of the first item; cause the second layout navigation route from the first current location of the second user to the location of the first item within the first establishment to be transmitted to and displayed by a second user device, associated with the second user, in association with at least one portion of the map of the layout of the first establishment.

Optionally, the operations further comprise cause turn-by-turn navigations instructions from the first current location of the first user to the first establishment for the first roadway navigation route to be presented on the first user device; cause turn-by-turn navigations instructions from the second current location of the first user to the location of the first item within the first establishment for the first layout navigation route to be presented on the first user device; cause turn-by-turn navigations instructions from the first current location of the second user to the location of the first item within the first establishment for the second layout navigation route to be presented on the second user device; and enable the first user and the second user to communicate via one or more communication channels. Optionally, the operations further comprise causing turn-by-turn navigations instructions from the second current location of the first user to the location of the first item within the first establishment for the first layout navigation route to be presented on the first user device. Optionally, the operations further comprise causing turn-by-turn navigations instructions for the second layout navigation route from the first current location of the second user to the location of the first item within the first establishment to be presented on the second user device. Optionally, the operations further comprise enabling the first user and the second user to communicate via one or more communication channels. Optionally, at least one of the first roadway navigation route or the first layout navigation route is generated using a shortest path algorithm. Optionally, at least one of the first roadway navigation route or the first layout navigation route is generated using at least one of Dijkstra's algorithm, Bellman—Ford algorithm, A* search algorithm, or Johnson's algorithm. Optionally, the map of the layout of the first establishment comprises a layout of aisles.

An aspect of the present disclosure relates to a method comprising: detecting that a user is at a first establishment using data received from a first user device associated with the first user; receiving a query regarding a first item via the first user device; determining a location of the first item within the first establishment; determining a first current location of the first user, the first current location at the first establishment; causing a first navigation route to be generated from the first current location of the first user to the location of the first item within the first establishment; causing the first navigation route from the first current location of the first user to the location of the first item within the first establishment to be transmitted to and displayed by the first user device in association with at least one portion of a map of a layout of the first establishment; receiving a first support request from the first user via the first user device; at least partly in response to the first support request from the first user, causing a second navigation route to be generated from a first current location of a second user to the location of the first item and/or of the first user; causing the second navigation route from the first location of the second user to the location of the first item and/or of the first user within the first establishment to be transmitted to and displayed by a second user device, associated with the second user, in association with at least one portion of the map of the layout of the first establishment.

Optionally, the method further comprises: causing turn-by-turn navigations instructions from the first current location of the first user to the location of the first item within the first establishment for the first navigation route to be presented on the first user device; causing turn-by-turn navigations instructions from the first location of the second user to the location of the first item and/or the first user within the first establishment for the second navigation route to be presented on the second user device; and enabling the first user and the second user to communicate via one or more communication channels. Optionally, the method further comprises: causing turn-by-turn navigations instructions from the first current location of the first user to the location of the first item within the first establishment for the first navigation route to be presented on the first user device. Optionally, the method further comprises: causing turn-by-turn navigations instructions for the second navigation route from the first location of the second user to the location of the first item and/or of the first user within the first establishment to be presented on the second user device. Optionally, the method further comprises: enabling the first user and the second user to communicate via one or more communication channels. Optionally, at least one of the first navigation route from the first current location of the first user to the location of the first item within the first establishment or the second navigation route from the first location of the second user to the location of the first item and/or of the first user within the first establishment is generated using a shortest path algorithm. Optionally, at least one of the first navigation route or the second navigation route is generated using at least one of Dijkstra's algorithm, Bellman—Ford algorithm, A* search algorithm, or Johnson's algorithm. Optionally, at least one of the first navigation route or the second navigation route is generated using a neural network comprising an input layer, an output layer, and at least one hidden layer. Optionally, the map of the layout of the first establishment comprises a layout of aisles. Optionally, the method further comprises: using a learning engine to select, based at least in part on characteristics of the first user and characteristics of the first item, usage content for the first item; enabling the first user to access the usage content selected using the learning engine. Optionally, the method further comprises: accessing location information for a plurality of people within at least the first establishment in real time; generating, in real time, an analysis based at least in on the accessed location information for the plurality of people within at least the first establishment; and transmitting the analysis, generated in real time, to one or more destinations.

An aspect of the present disclosure relates to a non-transitory computer readable memory having program instructions stored thereon that when executed by a computer system device cause the computer system to perform operations comprising: based at least in part on a communication from a first user device associated with a first user, the communication initiated at least partly in response to a camera of the first user device capturing an image of optical indicia, detect that a user is at a first establishment; receive a query regarding a first item via the first user device associated with the first user; determine a location of the first item within the first establishment; determine a first current location of the first user, the first current location at the first establishment; cause a first navigation route to be generated from the first current location of the first user to the location of the first item at the first establishment; and cause the first navigation route from the first current location of the first user to the location of the first item at the first establishment to be transmitted to and displayed by the first user device in association with at least one portion of a map of a layout of the first establishment.

An aspect of the present disclosure relates to a method comprising: detecting that a user is at a first establishment, optionally using data received from a first user device associated with the first user; receiving a query regarding a first item via the first user device; determining a location of the first item within the first establishment and providing an identification of the location of the first user to the first user device; receiving a first support request from the first user via the first user device; at least partly in response to the first support request from the first user, causing an identification of the location of the first item and/or of the first user to be provided to a device of a second user for display.

An aspect of the present disclosure relates to a search system configured to perform searches in response to user queries, the system comprising: a network interface; at least one processing device operable to perform operations comprising: utilize a large language model to extract metadata from a plurality of items of content related to one or more items; perform sentiment analysis to determine user sentiment regarding respective item attributes and/or items; assign respective values to one or more of a given item's attributes based at least in part on the determined user sentiment; receive, via the network interface over a network from a first user device, associated with a first user, a first query; perform a search for items satisfying the first query using the extracted metadata; rank items identified in the search based at least in part on respective values, the values based at least in part on the determined user sentiment, assigned to respective attributes associated with the items; and transmit, using the network interface, ranked search results, to the user device, the ranked search results corresponding at least in part to the item and/or item attribute rankings, wherein the ranked search results are displayed via the user device.

Optionally, the operations further comprise: aggregating data related to specific metadata; determining sentiment information using the aggregated data; generating rating data for item attributes corresponding to the specific metadata using the sentiment information. Optionally, the large language model comprises one or more hidden layers and one or more pooling layers. Optionally, the one or more items comprise respective products. Optionally, the operations further comprise identifying feedback for a given item of content, and based at least in part on the identified feedback, determine whether metadata and/or sentiment analysis from the given item of content is to be used in ranking items identified in the search. Optionally, the plurality of items of content related to one or more items comprises user item reviews and/or an aggregate rating based on the item reviews. Optionally, prior to utilizing the large language model to extract metadata from the plurality of items of content related to one or more items, a data cleaning process is performed on the plurality of items of content to remove HTML tags, punctuation, and/or stopwords. Optionally, the ranked search results comprise images of the corresponding items, selected excerpts from corresponding user content, and/or sentiment values. Optionally, the extracted metadata comprises respective identifiers associated with respective items, respective content creation dates, and respective item features. Optionally, the operations further comprise scraping at least a portion of the items of content from a plurality of websites and/or databases.

An aspect of the present disclosure relates to a computer-implemented method, the method comprising: utilizing an artificial intelligence engine to extract metadata from a plurality of items of content related to one or more items; performing sentiment analysis to determine user sentiment regarding respective item attributes and/or items; receiving, over a network from a first user device, associated with a first user, a first query; performing a search for items satisfying the first query using the extracted metadata; ranking items and/or item attributes identified in the search based at least in part on the sentiment analysis; and transmitting, using the network interface, ranked search results, to the user device, the ranked search results corresponding at least in part to the item and/or item attribute rankings, wherein the ranked search results are displayed via the user device.

Optionally, the method further comprises: aggregating data related to specific metadata; determining sentiment information using the aggregated data; generating rating data for item attributes corresponding to the specific metadata using the sentiment information. Optionally, the artificial intelligence engine comprises a large language model comprising one or more hidden layers and one or more pooling layers. Optionally, the one or more items comprise respective products. Optionally, the method further comprises identifying feedback for a given item of content, and based at least in part on the identified feedback, determine whether metadata and/or sentiment analysis from the given item of content is to be used in ranking items identified in the search. Optionally, the plurality of items of content related to one or more items comprises user item reviews and/or an aggregate rating based on the item reviews. Optionally, the method further comprises performing a data cleaning process on the plurality of items of content to remove HTML tags, punctuation, and/or stopwords. Optionally, the ranked search results comprise images of the corresponding items, selected excerpts from corresponding user content, and/or sentiment values. Optionally, the extracted metadata comprises respective identifiers associated with respective items, respective content creation dates, and respective item features. Optionally, the method further comprises scraping at least a portion of the items of content from a plurality of websites and/or databases.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

Figure 1A:
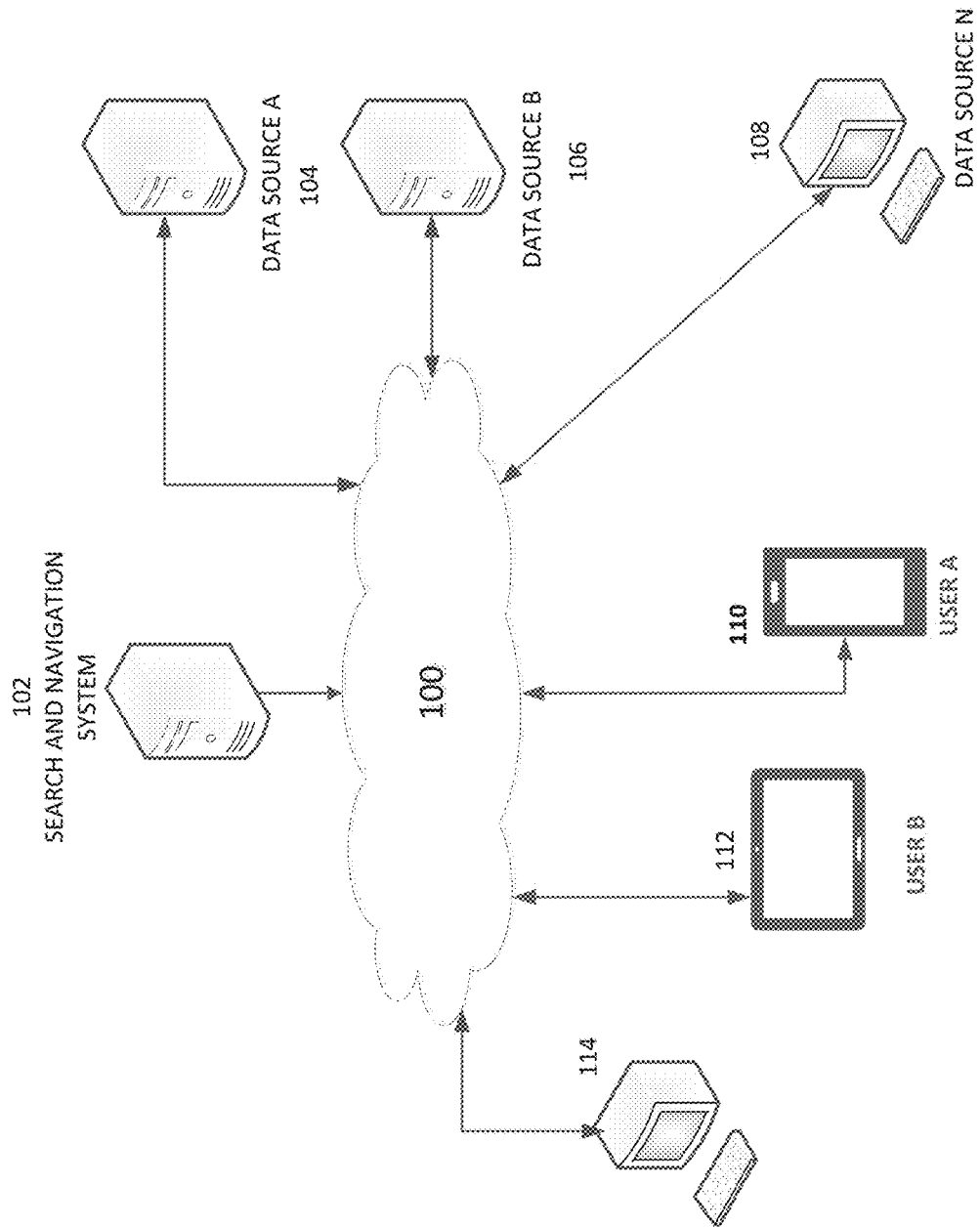
FIG. 1A illustrates an example operating environment.

An aspect of the present disclosure relates to systems and methods for enabling users to discover and be navigated to locations of interest, optionally using maps and/or turn-by-turn navigation directions. Another aspect of the present disclosure relates to navigating a user within a structure having a complex internal architecture. Yet another aspect of the present disclosure relates to navigating a user within a structure to meet another user within the structure.

An aspect of the present disclosure relates to enabling users to discover and locate products. For example, as similarly described elsewhere herein, an application may be downloaded to a user device that enables a user to submit a product search query to a remote system (e.g., a search and navigation system). The remote system may advantageously identify matching products and present, in search results, the matching products in a ranked order. The ranking of matches may be based on a variety of criteria, such as based on the closeness of the match, the quality of the matching products, the popularity of the matching products, the ease of use of the matching products, the cost of the matching products, the reliability of the matching products, the number of warranty claims made for the matching products, the number of product guarantee claims for the matching product, and/or other product characteristics.

The search results may advantageously provide a user with access to detailed information regarding a given product. Some or all of the detailed information may be presented directly in the search results or in response to the user selecting a product in the search results. Examples of detailed information may advantageously include some or all of the following: brand, durability, features, ease of use, user reviews/ratings, identification of similar products, size and dimension information, weight information, performance information, feature information, capacity information, compatibility information, durability information, color information, warranty information, product guarantee information, country of manufacture information, power requirement information, and/or other detailed information.

The user may select a product in the search results, and the remote system (e.g., the search and navigation system) will identify nearby stores that offer the product. In response to the user selecting a particular store, the system may advantageously enable navigation information to be provided to the user device. Once the user arrives at the selected store, the system may optionally identify where the product is located within the store and may provide corresponding navigation information to the user device (e.g., the aisle and shelf where the product is located). When the user is at the product location, optionally the user may utilize the application to request a service person to meet the user (e.g., at the product location within the store to answer user questions or otherwise assist the user).

Advantageously, the user may be enabled to purchase the product via the application on the user device and may further use the application to register the product (e.g., for product guarantee and/or warranty purposes). In addition to the convenience offered by such a product purchase process, the process of registering the product may be substantially or entirely automated.

Conventionally, a user may have to manually enter data (e.g., purchaser name, date of purchase, purchase price, seller name, model number of the product, serial number of product purchased, etc.) from a purchase receipt and elsewhere in order to register a product. However, because the product is optionally purchased using the same application that is being used to register the product, the application has some or all of the information needed to populate an online electronic product registration form. Thus, the application may utilize the purchase data and user data (e.g., purchaser name, date of purchase, purchase price, seller name, model number of product purchased, serial number of product purchased, etc.) to automatically populate the electronic product registration form. The registration form data received from the user device may be stored in memory by the system and/or which may be transmitted to another system (e.g., that of the product manufacturer) for storage.

As described elsewhere herein, the system may advantageously identify and recommend products that are compatible with or complementary to an acquired product. For example, if the acquired product is a phone, compatible and complementary items might include charging cables compatible with the phone, screen protectors compatible with the phone screen size, compatible phone cases, and/or the like. The compatible and complementary items may be identified based on historical purchase patterns (e.g., users who acquire a phone often acquire items usable with the phone) and/or by and/or by comparing technical specifications of the acquired item with those of other items. The application on the user device may present the recommended items and may enable the user to purchase one or more of the recommended items.

Advantageously, the system may select more relevant and useful instructional content (text, graphic, photographic, and/or video content) on how to utilize an acquired product, and enable such content to be presented to the user. The instructional content may be selected using a learning engine or algorithm based on certain user characteristics (e.g., the user's technical sophistication, the user's history of accessing instructional content for products, the types of item instructional content the user has historically access, and the like), and/or based on the product type and characteristics.

The system may prompt the user (e.g., via the application hosted on the user device) to enter a review on a product purchased via the application. Optionally, the user is only permitted to post a review for a product after the user has registered the product (e.g., as described herein). Advantageously, because the system has confirmation that the user has actually purchased the product, the system can authenticate the review as being from an actual purchaser of the product and so more likely to be qualified to review the product. Optionally, the system may electronically distribute the authenticated review via one or more channels. Such channels may include websites of different sellers of the product and/or social media platforms (e.g., microblogs, services that enable friends and business associates to connect, services that enable users to share content, etc.). The different channels may present a given review optionally with an indication that the review is from an actual purchaser of the product. Optionally, the system may aggregate reviews (including authenticated reviews) before distributing such reviews in order to reduce the number of network transactions and to reduce computer system utilization.

The search and navigation system may also generate and distribute various analytics. Such analytics may provide product manufacturers and distributors with more insight on desirable product features, information that should be included on product packaging, and information on preferred product placement within a retail establishment. For example, the analytics may show, optionally in real time, how many consumers are currently in a given establishment or set of establishments, how many consumers in a given establishment or set of establishments are currently viewing or evaluating a given product, and/or conversion data for a given product or overall (e.g., how many consumers have inquired regarding a given product/scanned an product optical indicia, how many consumers have placed the given product in an electronic shopping cart, how many of the given product have been purchased, etc.).

An aspect of the present disclosure relates to reputation management. Optionally, the disclosed systems and methods may enable a user's reviews to be aggregated so that a user may access the user's account, navigate to a review section, and view reviews previously provided by the user, where the review section user interface may be populated from user or review records. For example, the user may access the user's reviews via the dedicated application described herein or via a browser accessing the user's account records. Optionally, to enhance security, a password and/or user identifier may be needed to login to the user's account. The password and/or user identifier may be received from the user device via the application or a browser, and may be verified prior to providing access to the user's account.

The user may optionally share all or selectively share one or more of the user's reviews from the review user interface with a set of destinations or one or more selected destinations in a set of destinations (e.g., electronic sites, such as websites (e.g., commerce websites)). For example, a user interface may be presented on the user device, populated with the user's historical reviews and associated selection controls (e.g., checkboxes), and optionally a share all control. The user can select, using the selection controls, which reviews the user wants to share (or if the user wants to share all of the user's reviews). In addition, a destination user interface may be populated with potential sharing destination and associated selection controls (e.g., checkboxes) and a share with all destination control. The user can select, using the selection controls, which destinations the user wants to share the selected reviews with or if the user wants to share the selected reviews with all of the listed destinations. The disclosed systems and methods may store the user's review and destination selections, and share the reviews accordingly. Optionally, the reviews will only be shared with destinations that include a given reviewed product in their online catalog and/or are currently offering the reviewed product for sale. The destination may then post the review on its website and/or in its mobile applications, optionally in association with an online catalog document (e.g., a webpage) for the reviewed product.

Certain destinations may require a user to have an account in order to have the user's review posted in the destination's online catalog. In such instances, if the user indicates via a user interface, that the user has an account, the system may cause the destination's account log-in user interface so that the user (or the user's device) can populate the log-in user interface with the user's identifier and/or password. The destination system may then authenticate the user, and enable the user's review to be posted.

If the user does not have an account with the destination system, the search and navigation system may automatically create a destination account for the user. For example, the user may have a user account record with the search and navigation system. The user account record may contain user data needed or useful in creating an account for the user with the destination. Such user data may include, by way of example, a user name, a user physical address, a user email address, a user phone number, and/or other user data, such as other user data described herein. The search and navigation system may access an account creation user interface associated with the destination website or application, parse the account creation user interface (e.g., using a natural language process system) to determine what data is being requested for a given user interface field, and populate the parsed user interface with the user data access from the user record. The search and navigation system may create or enable the user to create a user identifier and/or password for the destination user account, which may then be used in creating the user destination account. The search and navigation system may store the user identifier and/or password for later use in future postings of the user's reviews to the destination's website and/or applications.

Thus, when attempting to post a user review with a given destination, the search and navigation system may determine if the destination requires a user account in order to post a review. If an account is not required, the search and navigation system may post the review using a review posting user interface of the destination (e.g., by parsing the review posting user interface and determining what data to enter into what field (e.g., a user identifier into a review name field, the review itself into a review field, etc.)). If the destination requires a user account in order to post a review and the user has a user account, the search and navigation system may populate or enable the user to populate the corresponding log-in user interface, then access the review posting user interface of the destination, parse the reviewing posting user interface, and post the user's review and other data in the appropriate fields. If the destination requires a user account in order to post a review and the user does not have a user account, the search and navigation system may create an account as described above, populate the corresponding log-in user interface, then access the review posting user interface of the destination parse the reviewing posting user interface, and post the user's review and other data in the appropriate fields.

Optionally, the search and navigation system may track how many reviews a user has submitted and/or on how many destinations the user's review were posted on. The system may generate a posting performance score based at least in part on how many reviews a user has submitted and/or on how many destinations the user's reviews were posted. Optionally, the user may be given a benefit (e.g., discounts, free products and/or services, etc.) based at least in part on the posting performance score. The system may transmit (e.g., via a webpage notification, an email, a messaging service message, and/or otherwise) the user's posting performance score and/or an identification of the benefits provided to the user.

Optionally, to reduce the amount of interaction between a user device and the search and navigation system (thereby reducing utilization of network and processing bandwidth) and to reduce the amount of time needed to enter a review, the system may prepopulate aspects of a review form (e.g., of a third party destination) and/or provide a user interface that enables a user to quickly complete a review.

For example, optionally an artificial intelligence engine (e.g., a learning engine) may be utilized to generate text and/or other content for a product review based on a user's definition of the user's experience with the product. For example, a user interface may ask the user to rate, on a certain scale (e.g., Excellent-Good-Acceptable-Below Average-Awful, a scale of 1 to 5, A to E, etc.) or to provide a tag or word regarding certain product features and/or factors (e.g., key factors or features, such as ease of use, style, reliability, quality of screen, quality of camera, etc.). Using the user inputs, a trained artificial intelligence engine may predict textual descriptions (e.g., whole sentences and/or paragraphs) that the user would compose, and enter the predicted descriptions into an editable free form review text field. The user may then be enabled to edit the text generated using the artificial intelligence engine, and the edited text may be saved in the user's account and/or posted as a user review as described herein.

The artificial intelligence engine may include learning engines, such as neural networks, described elsewhere herein. For example, the neural network may include an input layer, an output layer, and one or more hidden layers (see, e.g., FIG. 1C). A given layer may include multiple nodes associated with respective weights. The neural network may be trained (e.g., using sequence-to-sequence learning), and the node weights may be adjusted using backpropagation to minimize or reduce an error calculated using an error function. For example, using sequence-to-sequence learning the neural network may be trained to convert the input stream of tokens from one domain (e.g., phrases corresponding to the user's rating or the user's tags) to a stream of tokens in another domain (e.g., full sentence(s) and/or paragraph(s)). The neural network may optionally be implemented using a Long Short Term Memory (LSTM) neural network. The neural network may comprise an encoder and decoder. The neural network encoder may process the input information (e.g., the phrases corresponding to the user rating, the user's tags, etc.) and capture the context, and generate a context vector. The context vector is then input by the decoder. The decoder processes the context vector and generates the full review (in sentences and/or paragraphs) as an output.

Optionally, different neural networks may be trained for and use for different demographics or user profiles to reflect the different writing styles typical of respective demographics or other user characteristics (e.g., for different age groups, different geographical regions, different levels of education, different levels of income, different user device types, different user purchase histories, etc.). Then, when a user indicates that they want to submit a review (e.g., by activating a review submission user interface or a control therein), the user demographics and/or other characteristics may be accessed from a user record, and the appropriate trained neural network may selected and accessed. The selected neural network then may input the appropriate input data e.g., the phrases corresponding to the user rating, the user's tags, etc.) and generate a natural language review that is difficult or impossible to distinguish from a human written review. The review may then be posted as described herein.

As described herein, a search and navigation system, optionally comprising a learning engine, may be configured to analyze a user query regarding an item-type of interest to the user, identify suitable items of the item type, identify a physical structure in which one or more of the suitable items are present, navigate the user to the structure (e.g., by private vehicle, by public transportation, and/or by foot), and navigate the user (e.g., by foot) to a location within the structure where one or more of the suitable items are positioned. The search and navigation system may be further configured to navigate another person (e.g., an employee of the entity operating a business within the structure) to the user (e.g., where one or more of the suitable item(s) are positioned), so as to assist the user in evaluating or obtaining the item.

The user may interact with the system via a webservice accessed via a browser hosted on the user device, via an application dedicated to interacting with the search and navigation system and optionally other resources described herein, or otherwise. For example, the dedicated application or browser may be utilized to present user interfaces described herein to the user, to receive data and commands from the user and transmit the system to the search and navigation system, to receive data from the search and navigation system and present and/or utilize such data, and to provide other functions described here. The described systems, processes, and user interfaces are configured to provide a user with a consistent intelligence experience through the various phases of navigating to, acquiring and utilizing items.

The search and navigation system may include or have access to one or more databases that store historical information regarding the user. In addition, the search and navigation system may include or have access to one or more databases that store item details (e.g., a product manufacturer specification database, where the item is a manufactured product).

The historical user information may be stored in association with a user account established by the user (e.g., on the system or otherwise). The information may be expressly provided by the user and/or may be obtained by monitoring the user's queries regarding items, the user's processes of discovering information about items, the user's acquisition of items (e.g., the items, the item types, the item costs, the item brands, the item colors, the item sizes, the item functions, and/or the like), the user's access of instructions regarding use of items, the user's registration of items, the user's warranty claims, the user's product guarantee claims, and/or otherwise. For example, a database may store information on items that the user has historically acquired (e.g., phone models, televisions, computers, tablets, furniture, appliances, etc.), brand preferences, whether the user typically selects items on the low, medium, or high end of a range prices for a given item type, the user's home address, the user's work address, the user's technical sophistication, the user's store/establishment preferences, and/or other information. If the user issues a query regarding an item (e.g., a phone screen protector), the learning engine may infer that the user wants an item (e.g., a screen protector) compatible with an item in the user's possession (e.g., a phone). The learning engine may access details regarding the item (e.g., the screen dimensions), information regarding items that are the subject of the user query, and identifies items, that are the subject of the user query, that are compatible with (e.g., that fit), the item in the user's possession.

The learning engines described herein may be in the form of a neural network (e.g., feedforward, radial basis, Kohonen, recurrent, convolutional, and/or modular neural network). The learning engines may be trained using supervised or unsupervised learning. By way of further example, the learning engines may include learning engines in the form of a tree-based machine learning algorithm. (e.g., Classification and Regression Trees, sometimes referred to as "CART") that performs classification and regression tasks by building a tree-like structure for deciding the target variable class or value according to the features, where the CART may be trained using supervised learning. By way of yet further example, the learning engines may include learning engines in the form of Naïve Bayes Classifier Algorithms, that may be trained using supervised learning. The Naïve Bayes classifier may classify a given value as independent of any other value and may be used to predict, based on a given set of features, a class or category using probability.

Optionally, shortest path algorithms may be utilized to navigate vehicles, customers/users, and/or support personnel. For example, one or more of the following algorithms may be utilized: Dijkstra's algorithm (which solves the single-source shortest path problem with non-negative edge weight), the Bellman—Ford algorithm (which solves the single-source problem if edge weights may be negative), the A* search algorithm (which provides for fast searching by solving for single-pair shortest path using heuristic), the Floyd-Warshall algorithm (which solves all pairs shortest paths), or Johnson's algorithm (which solves all pairs shortest paths, and which may solve the shortest part problem more quickly than the Floyd-Warshall algorithm with respect to sparse graphs).

By way of still further example, the learning engines may include learning engines in the form of support vector machine algorithms that may be trained using supervised learning. A support vector machine algorithm may filter data into categories. By way of additional example, the learning engines may include learning engines in the form of learning regression algorithms and/or logistic regression algorithms.

Optionally, a combination of different types of learning engines (optionally including two or more of the types of learning engines disclosed herein) may be utilized.

After identifying a first set of item of items that satisfy/match a user item query, the system may filter and/or rank matches based on the closeness of the match, the quality of the matching items, the popularity of the matching items, the ease of use of the matching items, the cost of the matching items, the reliability of the matching items, the number of warranty claims made for the matching items, the number of product guarantee claims for the matching item, and/or other item characteristics. The system may cause some or all of the filtered and sorted matching items to be presented on the user device (e.g., via a dedicated application or a browser).

The system may detect a user selection of a matching item, determine an availability of the selected matching item at one or more establishments, select one of the establishments (e.g., based on distance from the user, based on the price set by the establishments for the item, based on user reviews of the establishments, based on current traffic patterns, based on the location of the item within the establishment (e.g., the shelf height, how far the item is from the establishment entrance), etc.), and generate a navigation route over roadways to the selected establishment or use a third party navigation service to generate a route over roadways and provide the user with navigation instructions to the selected establishment. For example, the search and navigation system may provide the third party navigation service with the user's current location and the address of the selected establishment via an application programming interface (API). In addition, an API to the third party navigation service may enable the system to customize maps with text, imagery, and other content (e.g., an image of the matching item, text identifying the matching item, etc.).

In an example scenario, rather than submitting a query ahead of time for an item, a user may simply go directly to an establishment with the intent of finding the desired item at the establishment. In such a scenario, the user may cause the establishment to be identified to the search and navigation system. For example, the user may capture, via a camera of the user device, an image of an optical indicia located on a sign, an exterior wall, a window, or at the entrance of the establishment structure. The optical code may be, by way of example, a one dimensional barcode or a two dimensional barcode (e.g., a QR code). The barcode may optically encode a unique identifier for the establishment. Where the establishment is part of a chain, the barcode may also identify the chain.

The user device may transmit the code to the search and navigation system, and the search and navigation system may use the code to identify the user's location. The user may also issue a query regarding the desired item type to the search and navigation system. The search and navigation system may identify potential item matches that are in the establishment inventory. For example, the search and navigation system may identify potential matching items as similarly discussed above (e.g., based on the price of potential matching items, based on reviews of the potential matching items, based on the location of the item within the establishment (e.g., the shelf height, how far the item is from the establishment entrance)), access an inventory database associate with the establishment, and determine if the establishment has matching items in inventory. The system may rank and filter the matches based on the closeness of the match, the quality of the matching items, the popularity of the matching items, the cost of the matching items, and/or other item characteristics. The system may cause some or all of the filtered and sorted matching items to be presented on the user device (e.g., via a dedicated application or a browser).

The user may select one or more of the presented items. In response to the user selecting an item, the system may access a layout of the establishment and stocking location data from a database and determine where in the establishment the item is located. For example, an establishment may be configured with aisles of shelving. The database may include inventory location information, indicating where a given item or item type is located, such as on which aisle, how far down the aisle from a reference point or at a given coordinate (e.g., x, y or x, y, z coordinates), and on what shelve. The system may use such information to determine the item aisle, aisle position, and shelf.

The system may then transmit item location data (e.g., aisle, aisle location, and shelf identifiers) to the user device for display to the user. In addition, a map of at least a portion of the establishment layout may be provided for display on the user device. The map may include an indicator (e.g., a graphic and/or text) indicating the user's current location (e.g., as determined from GPS data, Wi-Fi triangulation data, or other locator data from the user device) and an indicator as to the item's location.

Optionally, the system may generate a navigation route from the user's current position to the item location. The route may be presented in conjunction with the layout map (e.g., as a line from the user's current location, through the aisle(s), to the item location). Optionally, turn-by-turn instructions may be transmitted for display on the user device. Optionally, the user's progress in walking to the item location is monitored, and the turn-by-turn instructions are updated accordingly. Optionally, if the user misses a turn, a new, corrective, route may be generated from the user's "off route" position to the item location.

By way of illustration a user may arrive at the item location and evaluate the item. The user may optionally capture an optical code (e.g., a one dimensional or two dimensional barcode) on the item packaging or on the shelving unit where the item is located. The optical code may encode information about the item and/or a link to a resource (e.g., to a webpage) providing information on the item. For example, the information may include the name of the item, the item model number, one or more images of the item, an analysis if the item (e.g., a rating of the product, brand, durability, features, ease of use, user reviews/ratings; identification of similar items, and/or video and/or other analysis), size and dimension information, weight information, performance information, feature information, capacity information, compatibility information, durability information, color information, warranty information, product guarantee information, country of manufacture information, power requirement information, and/or other information. The item information (e.g., accessed directly from the optical code or accessed from the linked-to webpage) may then be presented to the user via the user device (e.g., audibly and/or visually via a dedicated application or a browser hosted on the user device).

The user, viewing and/or listening to the item information, may decide that the user still has questions or otherwise needs assistance. The user may then activate a control presented via the user device (e.g., via a dedicated application or browser) to initiate the transmission of a request for assistance. The request may be transmitted by the system or otherwise to a device associated with one or more support people. A support person may be assigned to assist the user. The name and/or photograph of the support person may optionally be transmitted to and presented on the user device. Optionally, a control may be provided enabling the user to call, text, or otherwise communicate with the support person.

In response to a user request for assistance or automatically, a support person at the establishment may be navigated to the user and/or item location. The system may transmit the item and/or user location (e.g., aisle, aisle location, and shelf identifiers) to the support person's device for display to the support person. In addition, a map of at least a portion of the establishment layout where the item and/or user are located may optionally be provided for display on the support person's device. The map may include an indicator (e.g., a graphic or text) as to the support person's current location (e.g., as determined from GPS data, Wi-Fi triangulation data, or other locator data from the user device), and an indicator as to the user's and/or item's location. The item may also be identified to the support person.

For example, a user interface may present to the support person some or all of the item information presented to the user and/or other information (e.g., a rating of the product, brand, durability, features, each of user, user reviews/ratings; similar items, video and/or other analysis), size and dimension information, weight information, performance information, feature information, compatibility information, durability information, color information, warranty information, product guarantee information, country of manufacture information, power requirement information, and/or other information). Optionally, the name and/or photograph of the user may be transmitted to and displayed by the service person's device. Optionally, a control may be provided enabling the service person to call, text, or otherwise communicate with the user.

Optionally, the system may generate a navigation route from the support person's current position to the user's or item's location. The route may be presented in conjunction with the layout map (e.g., as a line from the support person's current location, through the aisle(s) to the item's and/or user's location). Optionally, turn-by-turn instructions may be transmitted for display on the support person's device. Optionally, the support person's progress in walking to the user's or item's location is monitored, and the turn-by-turn instructions are updated accordingly. Optionally, if the support person misses a turn, a new, corrective, route may be generated from the support person's "off route" position to the user's or item's location. The service person may then assist the user in selecting an item. Optionally, a help queue user interface may be provided for display on the service person's device, where the help queue may contain one or more help requests for one or more identified items from one or more users. The help queue user interface may include a description of the items for which assistance is needed.

If the user desires to acquire the item, the user may add the item to a user electronic shopping cart via the user device (e.g., via a dedicated application or browser), may provide or select payment, and may complete the purchase. Optionally instead, the user may take the item from the item location to a point of sale device and purchase the item.

The user may then be prompted to register the item. For example, the prompt may be provided via a dedicated application, a browser, an email, a text message or otherwise. Optionally, the system may provide the user with information on how to use the item. The information may be in the form of textual, graphic, photographic, and/or video instructions. A learning engine, such as one or more of the learning engines disclosed herein, may be utilized in selecting the informational content presented to the user based on user characteristics (e.g., the user's technical sophistication, the user's history of accessing usage information for items, the device type the user has used to access item usage information, etc.) and/or on the item type and characteristics.

In addition, a user may be provided one or more communication channels to interact with user support, optionally in real time (e.g., via a dedicated application, browser, email, texting service, etc.).

A user interface may be provided via which the user can provide a review of the item (e.g., provide an overall rating for the item and/or ratings for various item characteristics, such as ease of use, durability, reliability, features, and/or the like).

Optionally, a user interface may be provided to the user device that provides recommendations as to items compatible or usable with the item acquired by the user. The recommendations may be generated using a learning engine. The user may select and purchase one or more of the recommended items via the user device. The acquired item and selected compatible items may optionally be provided to the user (e.g., by a service person) while the user is in the establishment or they may be delivered to a destination specified by the user.

Optionally, the system may be configured to generate various analytics using information obtained by the system via the various processes and databases described herein. For example, the analytics may show, optionally in real time, how many consumers are currently in a given establishment or set of establishments, how many consumers in a given establishment or set of establishments are currently viewing or evaluating a given item, and/or conversion data for a given item or overall (e.g., the how many consumers have inquired regarding a given item/scanned an item optical indicia, how many consumers have placed the given item in an electronic shopping cart, how many of the given item have been purchased, etc.). The foregoing data may also be provided for a historical period of time (e.g., the past 24 hours, the past week, the past year, or other specified period of time). The foregoing data may optionally be presented using a generated graph showing trends over a period of time. The foregoing data may be provided broken down by geographical region (e.g., by zip code, by city, by state, etc.), by establishment, by set of establishments, by time of day, by day of week, and/or otherwise. The analytics may be provided (e.g., electronically over a network) to one or more recipients (e.g., the establishment, the establishment chain, item distributors, item manufacturers, and/or other recipients) textually and/or graphically.

Certain aspects will now be described with reference to the figures.

An example system architecture that may be utilized to perform services described herein (e.g., search services, recommendation services, navigation services, communication services, help content services, analytic services, graphing services, and/or other services described herein) will now be discussed with reference to FIG. 1A. The various systems and devices may communicate with each other over one or wired and/or wireless networks 100 (e.g., the Internet, Ethernet, or other wide area or local area network). In the illustrated embodiment, a search and navigation service system 102 may be hosted on one or more servers. The search and navigation service system 102 may be cloud-based and may be accessed by one or more user computer systems 110, 112, 114 over the network 100. User computer systems 110, 112, 114 and data source computer systems 104, 106, 108 may be able to share software applications, computing resources, and data storage provided by the search and navigation service system 102.

The user computer systems 110, 112, 114 and data source computer systems 104, 106, 108 may be in the form of a desktop computer, laptop computer, tablet computer, mobile phone, smart television, dedicated server system, cloud-based system, and/or other computing system. The data source systems 104, 106, 108 may supply various items of data discussed herein, such as user data, item data, establishment data, layout data, navigation data, help and instructional content, analytic data, and/or other data described herein. By way of illustrated example, the data source systems 104, 106, 108 may include manufacturer product databases, brick and mortar store inventory databases, map databases, location image databases (e.g., satellite imagery, traffic signal cameras, security cameras within establishments/stores, etc.), review databases, user account databases, and/or other databases. The data may be pushed by the data source systems 104, 106, 108 (e.g., in real time in response to new data, or on a scheduled basis), and/or the data may be requested by the search and navigation service system 102 (e.g., on a scheduled basis or in response to a user requesting data, such as item data).

A given user computer system and a given data source computer system may include user input and output devices, such as displays (touch or non-touch displays), speakers, microphones, trackpads, mice, pen input, printers, haptic feedback devices, cameras, and the like. A user system or data source computer system may include wireless and/or wired network interfaces via which the computer systems may communicate with each other or the search and navigation service system 102 over one or more networks.

User interfaces described herein are optionally configured to present data (optionally in real time) from sources described herein and to receive user commands, which may optionally be executed by the search and navigation service system 102 or other systems in real time or in batch mode.

A client (e.g., a system browser or a dedicated network resource access application, such as a phone app that provides user interfaces described herein, hosted by a user computer system) may initiate a handshaking message to the search and navigation service system 102. The handshaking message may identify the cipher suites supported by the client and other cryptographic information (e.g., the maximum supported version of transport layer security or secure sockets layer, the client's order of preference). The handshaking message may optionally identify data compression methods supported by the user computer system. The handshaking message may include a random byte string that may be used in generating encryption keys.

The search and navigation service system 102 may respond to the client with a handshaking signal which identifies the cipher suite suit and encryption version (selected from those identified in the client handshaking message) that will be used. The search and navigation service system 102 message may also include a session ID and another random byte string. The search and navigation service system 102 may additionally transmit its digital certificate. The search and navigation service system 102 may also transmit a client certificate request that identifies the types of certificates supported and the Distinguished Names of acceptable Certification Authorities (CAs), which the client may verify.

The random byte string transmitted by the client to the search and navigation service system 102 may be utilized by both the client and the search and navigation service system 102 to generate a secret key that may be used for encrypting subsequent message data. Asymmetric encryption may be utilized to generate a shared secret key. The random byte string itself may be encrypted with the public key of the search and navigation service system 102.

By way of further example, a given item of data may be encrypted using an AES-128 key or public key cryptography/asymmetric cryptography. If symmetric encryption is used, then the encryption key and the decryption key may be the same key. If public key cryptography/asymmetric cryptography is used, then a public key may be used to encrypt the data and a private key may be generated to decrypt the data. Thus, communications described herein between a user device and a remote system may be performed using the foregoing secure communication technological techniques.

Optionally, a version of the user interfaces described herein may be enhanced for use with a small touch screen (e.g., 4 to 13 inches diagonal), such as that of a mobile phone or a tablet computer. For example, the orientation of the controls may be relatively more vertical rather than horizontal to reflect the height/width ratio of a typical mobile device display. Further, the user interfaces may utilize contextual controls that are displayed in response to an inferred user desire, rather than displaying a large number of tiny controls at the same time (which would make them hard to select or manipulate using a finger).

Figure 1B:
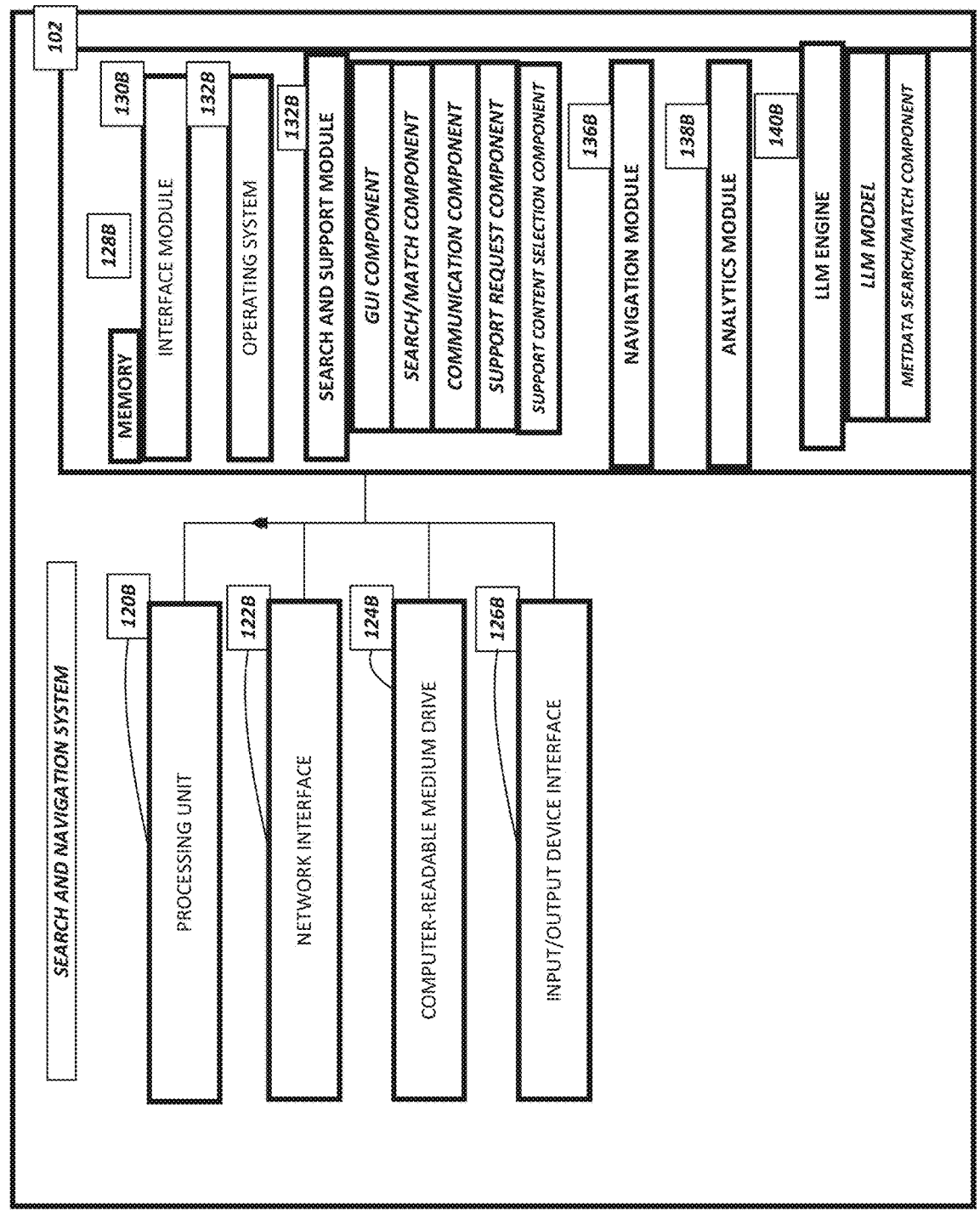
FIG. 1B illustrates an example search and navigation system architecture.

FIG. 1B depicts a block diagram illustrating an embodiment of example components of the example search and navigation service system 102 hosting a resource search and support module 134B configured to identify suitable items for a user and to provide support to a user, a navigation module 136B configured to provide navigation services, and an analytics 138B configured to provide real time and historical analytics related to items and users, such as, by way of example, analytics on real time and/or historical data related to some or all of the following: how many consumers are/were in a given establishment or set of establishments, how many consumers in a given establishment or set of establishments are currently/were viewing or evaluating a given item, conversion data (e.g., how many consumers have inquired regarding a given item/scanned an item optical indicia, how many consumers have placed the given item in an electronic shopping cart, how many of the given item have been purchased, etc.), and/or the like, as similarly described elsewhere herein. The system 102 includes an arrangement of computer hardware and software components that may be used to implement aspects of the present disclosure. Those skilled in the art will appreciate that the example components may include more (or fewer) components than those depicted in FIG. 1B.

The navigation module 136B may include a positioning module configured to determine a user's and/or support persons location (e.g., using GPS signals from respective devices and/or using a Wi-Fi positioning system (WPS)). Where a WPS is used, coordinates may be defined using Wi-Fi access point devices that transmit data. Using a received signal strength indicator and MAC-address for respective Wi-Fi access point devices, the navigation module 136B can define the current location of the user's device or the support person's device. Optionally, the navigation module may utilize multilateration, sometimes referred to as hyperbolic positioning, where an object is located by accurately computing the time difference of arrival (TDOA) of a signal emitted from the object to three or more receivers (e.g., Wi-Fi access points). The navigation module 136B may include a learning engine configured to predict traffic, and/or identify the shortest and/or simplest path(s) to an establishment or to an item within an establishment.

The system 102 hosting the resource search and support module 134B may include one or more processing units 120B (e.g., a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses.

The network interface 122B may provide connectivity to and communications with one or more networks or computing systems (e.g., one or more of the systems illustrated in FIG. 1A). The processing unit 120B may thus communicate information and instructions to and/or from other computing devices, systems, or services via a network. The processing unit 120B may also communicate to and from memory 128B and/or non-transitory computer-readable medium drive 124B and further provide output information via the input/output device interface 126B. The input/output device interface 126B may also accept input from one or more input devices, such as a keyboard, mouse, digital pen, touch screen, microphone, camera, other sensors, etc.

The memory 128B may contain computer program instructions that the processing unit 120B may execute in order to implement one or more aspects of the present disclosure. The memory 128B generally includes RAM, ROM (and variants thereof, such as EEPROM) and/or other persistent or non-transitory computer-readable storage media. The memory 128B may store an operating system 132B that provides computer program instructions for use by the processing unit 120B in the general administration and operation of the resource search and support module 134B, including its components, and the large language model (LLM) engine 140B.

The resource search and support module 134B may include a GUI component configured to generate graphical user interfaces which may be displayed on user systems/devices, a search/match component configured to perform search and match identification functions as described herein, a communication component configured to enable customers, support personnel, and systems to communication as described herein, a support request component configured to enable users to request help in selecting an item and/or using an item, and a support content selection component which may optionally utilize a learning engine is selecting support content (e.g., instructions and examples in how to use an item, which may be in the form of text, graphics, photographs, and/or videos).

The large language model engine 140B may include a large language model, and a metadata search and match component comprising a search engine configured to be utilized in conjunction with the output of the large language model. As described elsewhere herein, a large language model (LLM) may be employed to extract metadata from user reviews, analyze user sentiments, and provide an enhanced search experience.

Figure 1C:
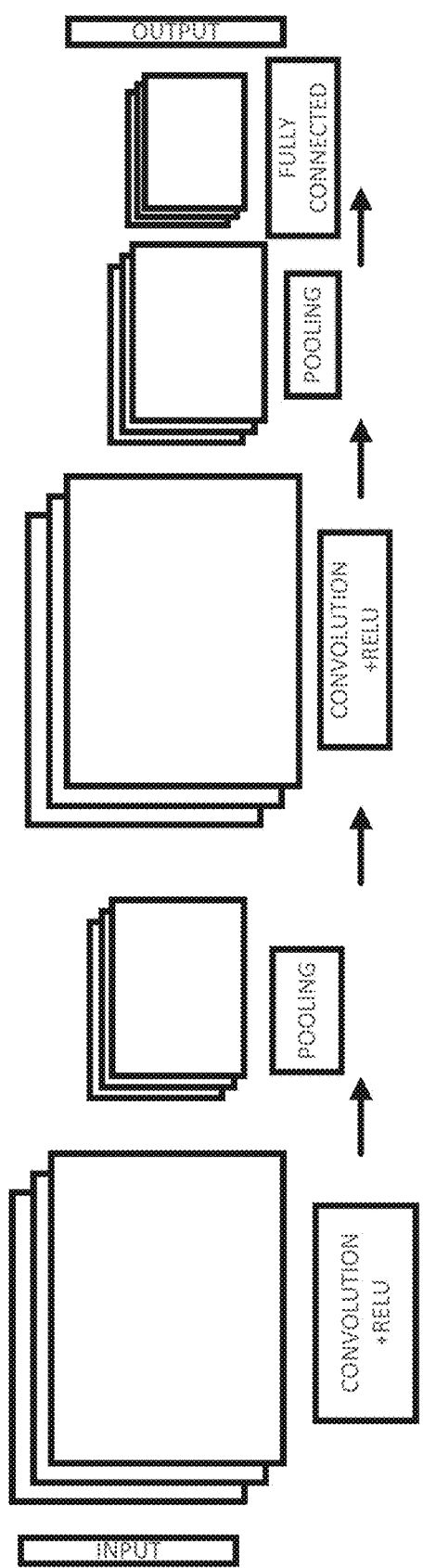
FIG. 1C illustrates an example convolutional neural network architecture.

The large language model engine 140B may be configured to enable users to search by one or more parameters specified in user reviews. The large language model engine 140B may be configured to rank the items (e.g., products or services) and/or item aspects (e.g., ease of use, durability, reliability, features, attractiveness, and/or the like) based in whole or in part on user sentiment. The large language model engine 140B may be configured to aggregate data around specific metadata to generate ratings and facilitate better-informed item selection (e.g., metadata above and beyond what might be provided by the merchant or manufacturer). The large language model engine 140B may comprise one or more neural networks, such as that described elsewhere herein and as illustrated in FIG. 1C.

The metadata search and match component may be configured to identify items matching a user search query based on metadata extracted from user item reviews. The matching items may be identified to the user via a user interface, in ranked order.

The memory 128B may store user accounts including, for a given user, user preferences (e.g., brand preferences, establishment preferences, cost preferences, preferences for types of support content, other preferences disclosed herein, and/or the like), item purchase history data, registered items, user technical sophistication, user help request history, user product guarantee claim history, user warranty claim history, user home address, user work address, user contact information, and/or other user data discussed herein. Optionally, the memory 128B may comprise a cloud-based or other networked data store. The account data may optionally be stored in a relational database, an SQL database, a NOSQL database, a hierarchical database, an object oriented database, a graph database, and/or other database type.

The memory 128B may include an interface module 130B. The interface module 130B can be configured to facilitate generating one or more interfaces through which a compatible computing device may send data to, or it may receive data from the system modules.

The modules or components described above may also include additional modules or may be implemented by computing devices that may not be depicted in FIGS. 1A and 1B. For example, although the interface module 130B and the navigation module 136B are identified in FIG. 1B as single modules, the modules may be implemented by two or more modules and in a distributed manner.

By way of further example, the processing unit 120B may include a general purpose processor and a graphics processing unit (GPU). The system hosting the search and support module 134B and the navigation module 136B may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the system hosting the various modules and their components can be implemented by network servers, application servers, cloud-base systems, database servers, combinations of the same, or the like, configured to facilitate data transmission to and from data stores, and other party systems via one or more networks. Accordingly, the depictions of the modules and components are illustrative in nature.

Referring now to FIG. 1C, an example convolutional neural network architecture is illustrated. As discussed herein, a learning engine, such as a neural network, may be configured to analyze a user query regarding an item-type of interest to the user, identify suitable items of the item type, identify a suitable establishment in which one or more of the suitable items are present, navigate the user to the establishment (e.g., by private vehicle, by public transportation, and/or by foot), navigate the user (e.g., by foot) to a location within the establishment to where one or more of the suitable items are positioned, navigate a support person to the user or items, and/or select usage/instructional content to present to the user.

Different types of learning engines may be utilized for different tasks. For example, a recurrent neural network (RNN) may be utilized to solve the shortest path problem in navigating user vehicles and/or users along a footpath.

Deep learning may be utilized to model nonlinear interactions in data with nonlinear activations such as ReLU, Sigmoid, or Tanh. For example, a Multi-Layer Perceptron (MLP) recommendation network may be utilized, the MLP recommendation network configured as a feed-forward neural network with multiple hidden layers between the input layer and the output layer.

A neural network can be used to recommend items similar to those a user has expressed an interest in (e.g., by selecting one or more items in a list of items of a given type).

Referring again to FIG. 1C, the example neural network includes convolution+ReLU layers, which together with the pooling layers act as feature extractors. For example, the convolution+ReLU layers, together with the pooling layers, may act as feature extractors with respect to an input image (e.g., an image of an item the user has expressed interest in), and the fully connected layer may acts as a classifier. There may be more or fewer layers than those illustrated in FIG.

1C. Further, there does not need to be a pooling layer, and there does not need to be a pooling layer for each convolution+ReLU layer.

The convolutional neural network may be trained (e.g., to classify features in an image, to select content suitable for a user, to perform navigation services, etc. The neural network filters and weights may be initialized with random values. During training, training data may be used as an input to train the neural network to perform identification and tagging. A forward propagation step may be performed (e.g., convolution, ReLU, and pooling operations, and forward propagation in the fully connected layer) and the convolutional neural network may generate output probabilities for each class. The total error at the output layer may be calculated using an error function. Backpropagation may be used to update filter values and node weights to reduce or minimize the output error. The weights may be adjusted in proportion to their contribution to the total error. This process may be repeated for multiple sets of training data (e.g., images of items) so as to train the convolutional neural network to correctly identify and classify image objects.

Certain example processes will now be described with reference to FIGS. 2A-2C. The processes may be executed using one or more of the systems and devices illustrated in FIGS. 1A-1C and/or as described elsewhere herein.

Figure 2A:
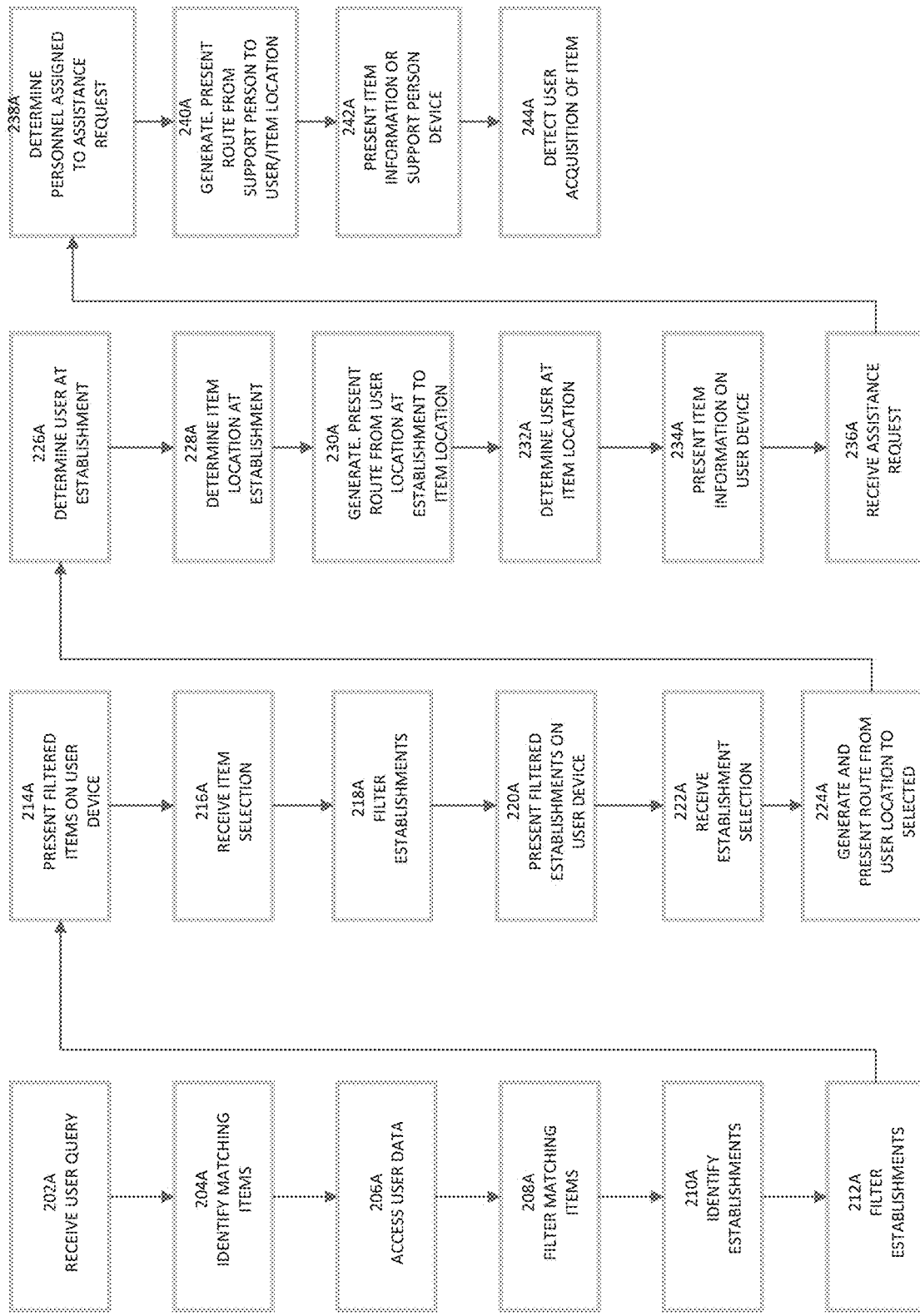
FIGS. 2A-2D illustrate example processes.

Referring to FIG. 2A, the illustrated process is applicable to determining suitable items for a user and to identifying one or more establishments that have such suitable items. At block 202A, a user item query is received. For example, the user item query may be received from a user device at the search and navigation service system 102. At block 204A, the process identifies a set of items matching the item query. For example, the process may utilize a learning engine, as described elsewhere herein, or syntactical features/matching algorithms (e.g., N-gram matching features, such as BM25F or TF-IDF), and an item database that includes item attributes. The identified matching items may be ranked based on the closeness of the match.

At block 206A, user data may be accessed (e.g., from a user account database). The user data may include user brand preferences, establishment preferences, cost preferences, preferences for types of support content, item purchase history data, registered items, user technical sophistication, user help request history, user product guarantee claim history, user warranty claim history, user home address, user work address, user contact information, and/or other user data discussed herein.

At block 208A, the set of matching items is optionally filtered using the user data. For example, certain brands of items may be filtered out if they are not preferred brands. By way of further example, certain items may be filtered out if their ease of use is low and the user's technical sophistication is low. By way of still further example, certain items may be filtered out if they lack support content in a form preferred by the user (e.g., in a video form). By way of additional example, certain items may be filtered out if their cost does not fit the user's cost preferences.

At block 210A, a set of suitable establishments are identified. For example, the inventory of various establishments (e.g., physical stores) may be accessed from respective inventory databases to identify which establishments have the items in stock. Optionally, the search may be limited to within a certain geographic area local to the user's home address, work address, and/or the geographical region associated with the user's IP address, advantageously reducing the amount of computer and network resources needed to perform the inventory search.

At block 212A, the identified set of establishments may be optionally filtered using the user data. For example, the user's establishment preferences, the availability of parking, the establishment operating hours, and/or other criteria may be used to filter the set of establishments.

At block 214A, the filtered set of items may be presented to the user. For example, the filtered set of items may be transmitted over a wireless network to the user's device and presented by a browser or dedicated application hosted on the user device. The presented set of items may include information regarding each presented item (e.g., an item image, an item name, an item cost, an item rating, a brief item description, and/or the like).

At block 216A, a user selection of the presented filtered set of items is received over the wireless network from the user device. The user may make the selection by touching the item in the presented set or otherwise. Advantageously, because only a subset of the matching items is transmitted to the user device, the amount of network bandwidth, user device memory, user device processing bandwidth, and display area may be reduced.

At block 218A, the previously filtered set of establishments may optionally be further filtered to include only those establishments that have the user selected item in stock (e.g., as determined using the data obtained at block 210A). At block 220A, the twice filtered set of establishments are transmitted for display on the user device. Advantageously, because only a subset of the identified establishments is transmitted to the user device, the amount of network bandwidth, user device memory, user device processing bandwidth, and display area may be reduced. At block 222A, a user selection of the presented twice filtered set of establishments is received over the wireless network from the user device.

At block 224A, the user's current location is determined (e.g., as determined from position data, such as GPS data, Wi-Fi triangulation data, a manual entry by the user, or other locator data from the user device). Optionally, two or more sources of position data may be utilized (e.g., both GPS data and Wi-Fi triangulation data) to enhance positioning accuracy and to enhance reliability. The process may generate or have generated (e.g., by a third party navigation service as described elsewhere herein) a navigation route from the user's current location to the location of the selected establishment. The route may be presented on the user device (e.g., presented in conjunction with a map). The route generation may optionally default to vehicular navigation, with a user-selection option to request navigation by foot or public transportation. Optionally, turn-by-turn directions may be provided for the route which may be displayed by and/or audibly spoken by the user device, thereby enhancing the user device human factor performance.

At block 226A, a determination is made that the user is at the selected establishment. For example, the determination may be made using position data determined from GPS data, Wi-Fi triangulation data, a manual entry by the user, or other locator data from the user device. By way of further example, the determination may be made by the user capturing an image of an optical indicia (e.g., a barcode, such as a QR code) at the selected establishment which causes the user device to access a link providing an indication that the user is at the selected establishment. By way of yet further example, the user may "check-in" by activating an "I'm here" control via a dedicated application, browser, or otherwise on the user device.

At block 228A, the location (e.g., aisle and shelf) of the selected item within the establishment is determined (e.g., from establishment layout data accessed from a database). At block 230A, a route is generated from the user's current location (e.g., as determined using techniques described herein) to the item's location using the layout data. The route may be transmitted to the user device and presented to the user (e.g., presented in conjunction with a layout map of the establishment). Optionally, turn-by-turn directions may be provided for the route and displayed and/or audibly spoken to the user by the user device.

At block 232A, a determination is made that the user is at the item location within the establishment (e.g., as determined using techniques described herein, such via Wi-Fi positioning, GPS positioning, the user device capturing an image of optical indicia, such as a barcode on the item packaging or otherwise at the item location and accessing a link encoded in the optical indicia, etc.). At block 234A, detailed item information and analysis may be accessed, transmitted to the user device, and displayed to the user. For example, the detailed item information and analysis may optionally include ratings of the product, brand, durability, features, ease of use, capacity. The detailed item information and analysis may optionally include user reviews/ratings, the identification of similar items, video usage information, size and dimension information, weight information, performance information, feature information, compatibility information, durability information, color information, product guarantee information, warranty information, country of manufacture information, power requirement information, and/or other information. For example, the detailed item information and analysis may be transmitted to and/or presented on the user device at least partly in response to detecting that the user is at the item location and/or in response to a user request for such information.

At block 236A, a user request for assistance is received from the user device (e.g., in response to the user activating an assistance request control). At block 238A, a determination is made as to which service person is available to respond to the user assistance request. For example, the request may be transmitted to multiple service persons' devices, and the user service person that activates an accept control will be assigned to service the user request. Optionally, a name or other identifier of user the user may be transmitted to and presented on the service person's device.

At block 240A, a route (optionally presented in conjunction with a layout map of the establishment) from the service person's present position (e.g., determined using techniques described herein) to the user's and/or item's position may be generated, transmitted to and presented by the service person's device. Optionally, turn-by-turn directions may be provided for the route to the user's device for display and/or for audible reproduction.

At block 242A, item information and analysis may be transmitted to and displayed by the service person's device to enable the service person to assist the user. For example, an item manual, a rating of the product, brand, durability, features, ease of use, user reviews/ratings; similar items, size and dimension information, weight information, performance information, feature information, compatibility information, durability information, color information, product guarantee information, warranty information, country of manufacture information, power requirement information, item usage images/text/videos, and/or other information and analysis may be presented. At block 244A, a determination may be made that the user has added the item to an electronic shopping and/or has purchased the item. The process may optionally proceed to the process illustrated in FIG. 2C, which will be discussed in greater detail herein.

Figure 2B:
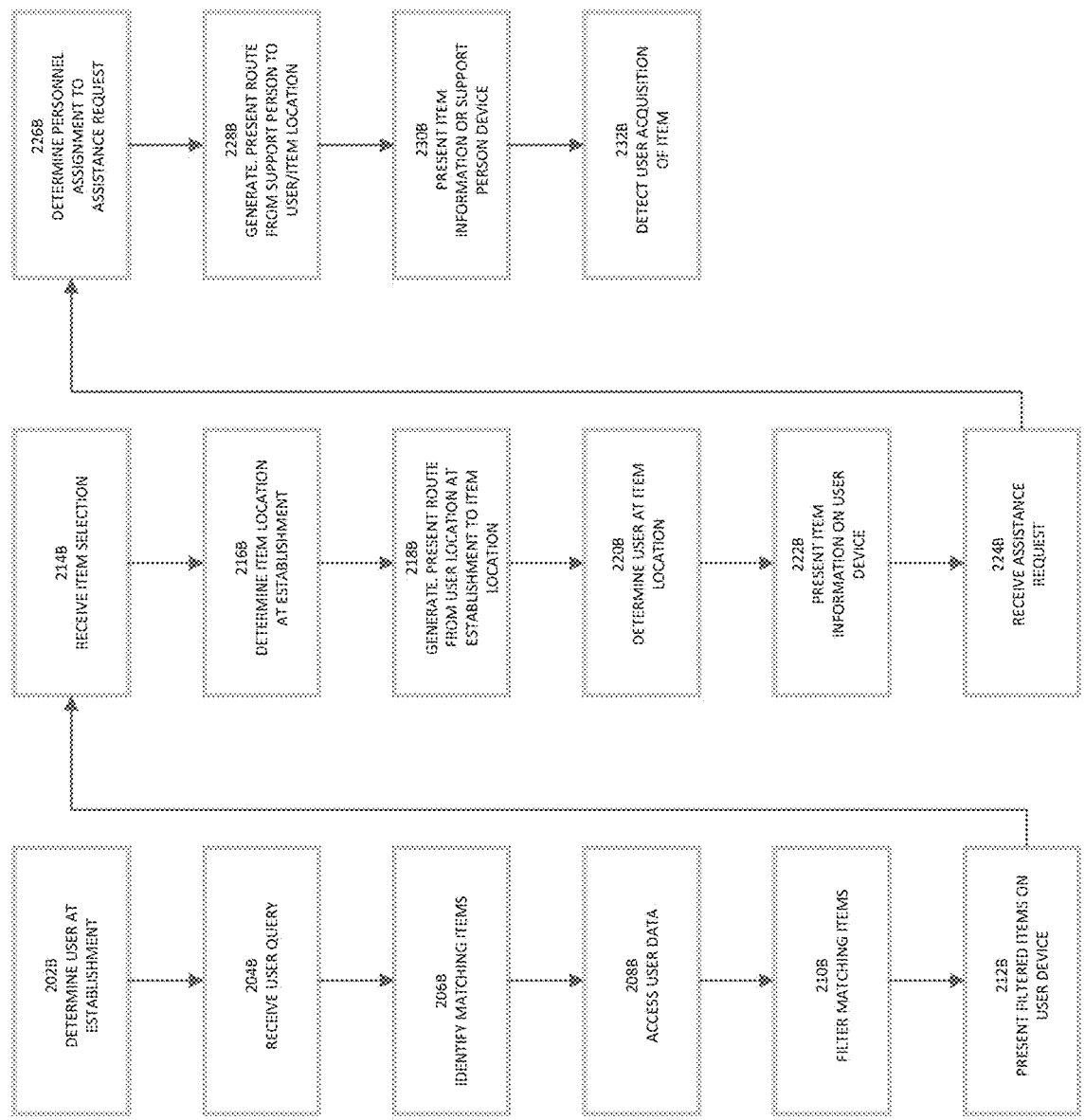

Referring to FIG. 2B, the illustrated process is applicable to determining that a user is present at an establishment and identifying one or more items at the establishment to the user (e.g., where the user did not first select the establishment from a list generated by the system 102). At block 202B, a determination is made that the user is at an establishment. For example, the determination may be made using position data determined from GPS data, Wi-Fi triangulation data, a manual entry by the user, or other locator data from the user device. By way of further example, the determination may be made by the user capturing an image of an optical indicia (e.g., a barcode, such as a QR code) which causes the user device to access a link providing an indication that the user is at the establishment. By way of yet further example, the user may "check-in" by activating an "I'm here" control via a dedicated application, browser, or otherwise on the user device.

At block 204B, a user item query is received. For example, the user item query may be received from a user device, while the user is at the establishment, at the search and navigation system 102. At block 206B, the process identifies a set of items matching the item query. For example, the process may utilize a learning engine, as described elsewhere herein or syntactical features/matching algorithms (e.g., N-gram matching features, such as BM25F or TF-IDF), and/or an item database that includes item attributes. The identified matching items may be ranked based on the closeness of the match.

At block 208B, user data may be accessed (e.g., from a user account database). The user data may include user brand preferences, establishment preferences, cost preferences, preferences for types of support content, item purchase history data, registered items, user technical sophistication, user help request history, user product guarantee claim history, user warranty claim history, user home address, user work address, user contact information, and/or other user data discussed herein.

At block 210B, the set of matching items is optionally filtered using the user data. For example, certain brands of items may be filtered out if they are not preferred brands. By way of further example, certain items may be filtered out if their ease of use is low and the user's technical sophistication is low. By way of still further example, certain items may be filtered out if they lack support content in a form preferred by the user (e.g., in a video form). By way of additional example, certain items may be filtered out if their cost does not fit the user's cost preferences.

At block 212B, the filtered set of items may be presented to the user. For example, the filtered set of items may be transmitted over a wireless network to the user's device and presented by a browser or dedicated application hosted on the user device. The presented set of items may include information regarding each presented item (e.g., an item image, an item name, an item cost, an item rating, a brief item description, and/or the like).

At block 214B, a user selection of the presented filtered set of items is received over the wireless network from the user device. The user may make the selection by touching the item in the presented set or otherwise. Advantageously, because only a subset of the matching items is transmitted to the user device, the amount of network bandwidth, user device memory, user device processing bandwidth, and display area may be reduced.

At block 216B, the location (e.g., aisle and shelf) of the selected item within the establishment is determined (e.g., from establishment layout data accessed from a database).

At block 218B, the user's current location is determined (e.g., as determined from position data, such as GPS data, Wi-Fi triangulation data, a manual entry by the user, or other locator data from the user device). Optionally, two or more sources of position data may be utilized (e.g., both GPS data and Wi-Fi triangulation data) to enhance positioning accuracy and to enhance reliability The process may generate or have generated a navigation route from the user's current location to the location of the item. The route may be presented on the user device (e.g., presented in conjunction with a map). Optionally, turn-by-turn route directions may be provided to the user's device for display and/or for audible reproduction.

At block 220B, a determination is made that the user is at the item location within the establishment (e.g., as determined using techniques described herein, such via Wi-Fi positioning, GPS positioning, the user device capturing an image of optical indicia, such as a barcode on the item packaging or otherwise at the item location, and accessing a link encoded in the optical indicia, etc.).

At block 222B, detailed item information and analysis may be accessed, transmitted to, and displayed by the user device to the user (e.g., a rating of the product, brand, durability, features, ease of use, user reviews/ratings; similar items, video and/or other analysis; size and dimension information, weight information, performance information, feature information, compatibility information, durability information, color information, product guarantee information, warranty information, country of manufacture information, power requirement information, and/or other information). For example, the detailed item information and analysis may be transmitted to and/or presented on the user device at least partly in response to detecting that the user is at the item location and/or in response to a user request.

At block 224B, a user request for assistance is received from the user device (e.g., in response to the user activating an assistance request control). At block 226B, a determination is made as to which service person is available to respond to the user assistance request. For example, the request may be transmitted to multiple service persons' devices, and the user service person that activates an accept control will be assigned to service the user request. Optionally, a name or other identifier of the user may be transmitted to and presented on the service person's device.

At block 228B, a route (e.g., presented in conjunction with a layout map of the establishment) from the service person's present position (e.g., determined using techniques described herein) to the user's and/or item's position may be generated, transmitted to and presented by the service person's device. Optionally, turn-by-turn directions may be provided for the route for display and/or for audible reproduction.

At block 230B, item information and analysis may be transmitted to and displayed by the service person's device to enable the service person to assist the user. For example, an item manual, a rating of the product, brand, durability, features, ease of use, user reviews/ratings; similar items, video and/or other analysis, size and dimension information, weight information, performance information, feature information, compatibility information, durability information, color information, product guarantee information, warranty information, country of manufacture information, power requirement information, and/or other information and analysis may be presented. At block 232B, a determination may be made that the user has added the item to an electronic shopping and/or has purchased the item. The process may optionally proceed to the process illustrated in FIG. 2C, which will be discussed in greater detail herein.

Figure 2C:
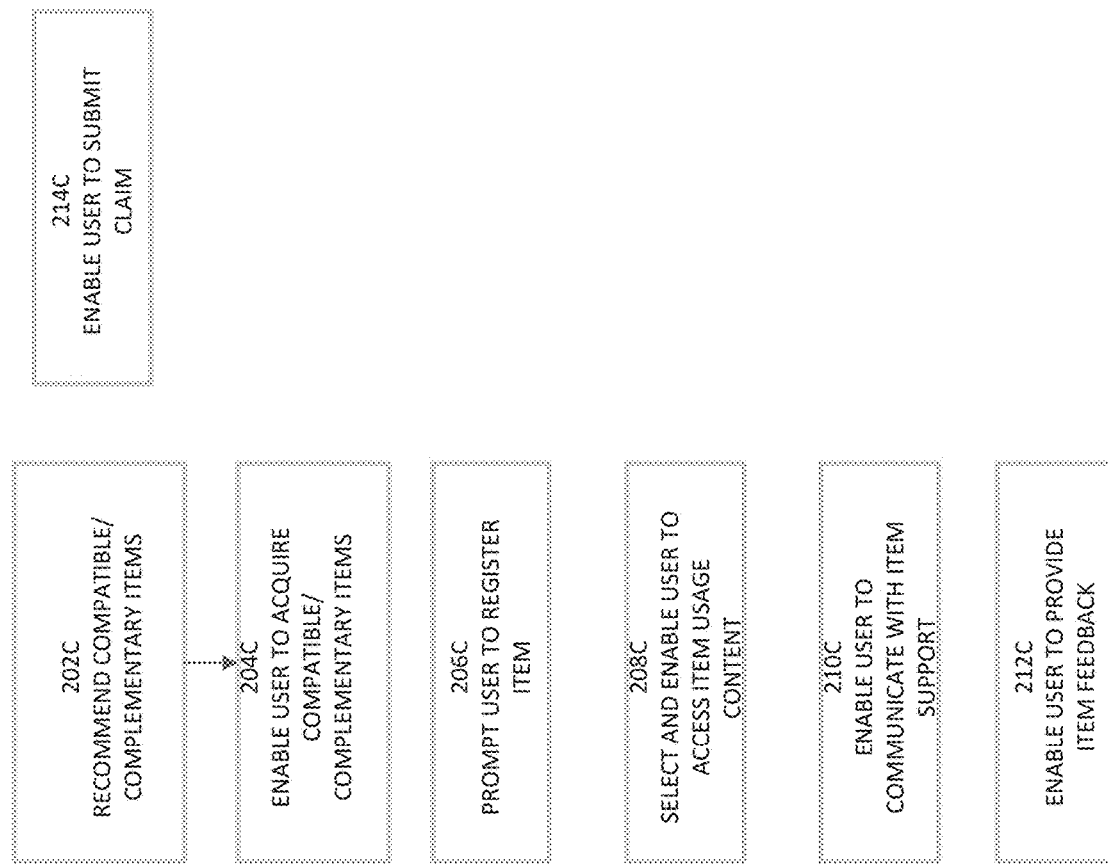

Referring to FIG. 2C, example post-acquisition actions with respect to an item are illustrated. At block 202C, items that may be compatible with or complementary to the acquired item are identified. For example, if the acquired item is a phone, compatible and complementary items might include charging cables compatible with the phone, screen protectors compatible with the phone screen size, compatible phone cases, and/or the like. The compatible and complementary items may be identified based on historical purchase patterns (e.g., users who acquire a phone often acquire items usable with the phone) and/or by and/or by comparing technical specifications of the acquired item with those of other items. The identification of compatible and complementary items may be performed using a learning engine, such as a learning engine disclosed herein. The identified compatible with or complementary items may be transmitted to the user device for display. At block 204C, the user may be enabled to acquire one or more of the identified compatible or complementary items (e.g., by activating a purchase control or via an establishment point of sale system). If the acquisition is performed while at the establishment, a service person may deliver the compatible or complementary items to the user prior to the user leaving the establishment.

At block 206C, the user may be prompted (e.g., via a dedicated application hosted on the user device, via a webpage presented by a user device browser, via a text message, via an email, or otherwise) to register one or more of the acquired items. Registration may include storing item identifiers (e.g., serial numbers), date of acquisition, and/or price, in association with a user identifier (e.g., email address), and optionally in a user account. In response to such registration, the user may be provided with one or more benefits (e.g., extended product guarantee, extended warranty, enhanced support services, etc.). Optionally, if the item is acquired using the same application that is being used to register the item, the application has some or all of the information needed to populate an item registration form. Thus, the application may utilize the purchase data and user data (e.g., purchaser name, date of purchase, purchase price, seller name, model number of item purchased, serial number of item purchased, etc.) to populate the item registration form, which may be stored in memory by the system and/or which may be transmitted to another system (e.g., that of the item manufacturer) for storage.

At block 208C, the process may select item usage content (e.g., instructional content, such as text, graphic, photographic, and/or video content) for an item acquired by the user. The content may be selected using a learning engine or algorithm based on certain user characteristics (e.g., the user's technical sophistication, the user's history of accessing usage information for items, the types of item usage content (e.g., where the types may include text, graphic, photographic, and/or video content types), the user's historical access percentage for each type of item usage content type, the device type the user has used to access item usage information, etc.), and/or on the item type and item characteristics. Optionally, a learning engine, such as those disclosed herein, may be utilized in selecting such content. The content, in the form of a document or a link to the content, may be transmitted to the user device. The content may then be provided to the user (e.g., displayed to the user, played back to the user, etc.).

At block 210C, the user is enabled to communicate with a support person while in the establishment with the support person (e.g., to assist the user in analyzing and acquiring an item) or after acquisition of the item (e.g., for post-purchase support). The communication may be provided via one or more communication channels, such as audio-only channels, audio-video channels, or text channels.

At block 212C, a feedback user interface may be provided (e.g., via a dedicated application or a webpage presented via a browser) for display on the user device via which the user may review or rate an item. For example, the user interface may enable the user to provide an overall rating for the item and/or ratings for various item characteristics, such as ease of use, durability, reliability, features, attractiveness, and/or the like. The user feedback may be stored in association with an item record. The user feedback may be aggregated with that of other users and presented to other users, and/or provided to the establishment, the item distributor, and item manufacturer. For example, the application hosted on the user device may prompt the user to enter an item review on an item acquired via the application. Advantageously, because the process has confirmation that the user has actually acquired the item, the process can authenticate the review as being from an actual acquirer of the item. Optionally, the process may distribute the authenticated review via one or more channels. Such channels may include websites of different sellers of the item, via social media (e.g., microblogs, services that enable friends and business associates to connect, services that enable users to share content, etc.). The different channels may present a given user review with an indication that the review is from an actual acquirer of the item. Optionally, the system may aggregate reviews (including authenticated reviews) before distributing such reviews in order to reduce the number of network transactions and to reduce computer system utilization.

At block 214C, a user interface may be presented on the user device (e.g., via a dedicated application or a webpage presented via a browser) that enables a user to submit a claim (e.g., a claim for a defective item). For example, a user may request or be entitled to a refund of the item price, a replacement of the item, or a repair of the item. The user interface may display items previously acquired by the user as determined from a user account. The user may select an item from the displayed item for which to submit a claim. Alternatively or in addition, a user may be enabled to submit item identification data (e.g., model name and/or serial number) via one or more corresponding fields. The claim may then be processed by the system.

Figure 2D:
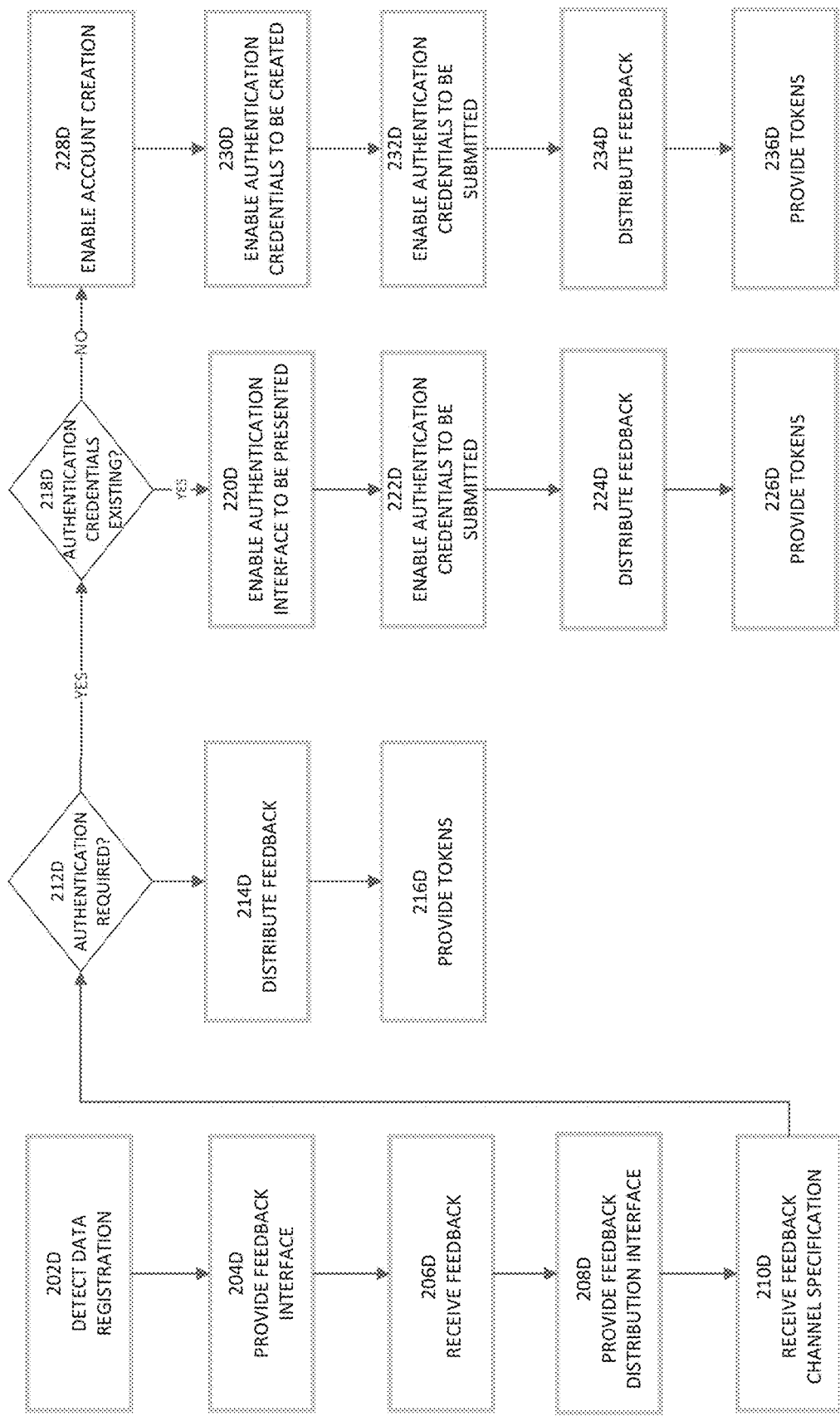

FIG. 2D illustrates another example process. At block 202D, a system, such as that disclosed herein, detects that the user has registered an item, such as a product obtained from seller. The registration may have been received via a user device (e.g., via a dedicated application or a website interface). In response to detecting the registration (which indicates that the user has actually obtained the item), at block 204D, a feedback user interface for the item is presented to the user. The feedback user interface may enable the user to provide a text entry, a score (e.g., a rating of 1 to 5), an emoji specification, and/or other feedback. At block 206D, the feedback from the user is received from the user device. At block 208D, a feedback distribution interface is provided for display on the user device (see, e.g., FIG. 3N). The feedback distribution interface may identify one or more distribution channels (e.g., websites, applications, social media sites, etc.) with which the feedback may be shared (e.g., posted). For example, the user may select one or more of the distribution channels, all the distribution channels, or none of the distribution channels. At block 210D the user specification of the distribution channels is received.

At block 212D, a determination is made as to whether user authentication (e.g., a user account) is needed in order to post or otherwise distribute the feedback via a given specified distribution channel. If authentication is not required (e.g., an account with the distribution is not required), at block 214D the feedback may be posted to the distribution channel and at block 216D the user may be provided with tokens (which may be currency, a discount coupon, loyalty points, or other benefit).

If authentication is required, at block 218D, a determination may be made as whether the user has existing authentication credentials (e.g., a password and/or user identification associated with an existing user account with the distribution channel). For example, the user may be prompted, at block 220D, via a user interface to indicate whether or not the user has an account, or a determination may be made via a previous response provided by the user that is stored in a user record. If the user has existing authentication credentials, the account log-in user interface (see, e.g., FIGS. 3O, 3P) may be presented to the user via the user device so that the user (or the user's device) can populate the log-in user interface with the user's authentication credentials (e.g., identifier and/or password). At block 222D, the authentication credentials may be submitted to the distribution channel authentication system. At block 224D, when the user is authenticated, the feedback is posted by the distribution channel. At block 226D the user may be provided with tokens (which may be currency, loyalty points, a discount coupon, or other benefit).

At block 228D, if a determination is made that the user does not have an account with the destination system (and corresponding authentication credentials) and an account is needed to post feedback, at block 230D, a distribution channel account may be automatically created for the user. For example, the user may have a user account record stored in memory with the system. The user account record may contain user data needed or useful in creating an account for the user with the distribution channel. Such user data may include, by way of example, a user name, a user physical address, a user email address, a user phone number, and/or other user data, such as other user data described herein. The process may access an account creation user interface associated with the distribution channel (see, e.g., FIGS. 3Q, 3R), parse the account creation user interface (e.g., using a natural language process system) to determine what data is being requested for a given user interface field, and populate the parsed user interface with the user data access from the user record. The process may create or enable the user to create a user identifier and/or password for the distribution channel user account, which, at block 232D, may then be submitted and used in creating the account. The process may store the user identifier and/or password for later use in future postings of the user feedback to the distribution channel's website and/or applications. At block 234D, the feedback is posted by the distribution channel. At block 236D the user may be provided with tokens (which may be currency, loyalty points, a discount coupon, or other benefit).

Certain example user interfaces will now be discussed with reference to FIG. 3A-3R. As similarly discussed elsewhere herein, the user interfaces may be presented via an application (e.g., a phone app) hosted on the user device dedicated to providing certain services described herein, such as enabling a user to submit item queries, view search results, access and view navigation routes, access item data and analysis, communicate with support personnel, access support content, and/or submit claims. Optionally, in addition or instead, the user interfaces may be accessed as webpage via a user device browser via a website.

Figure 3A:
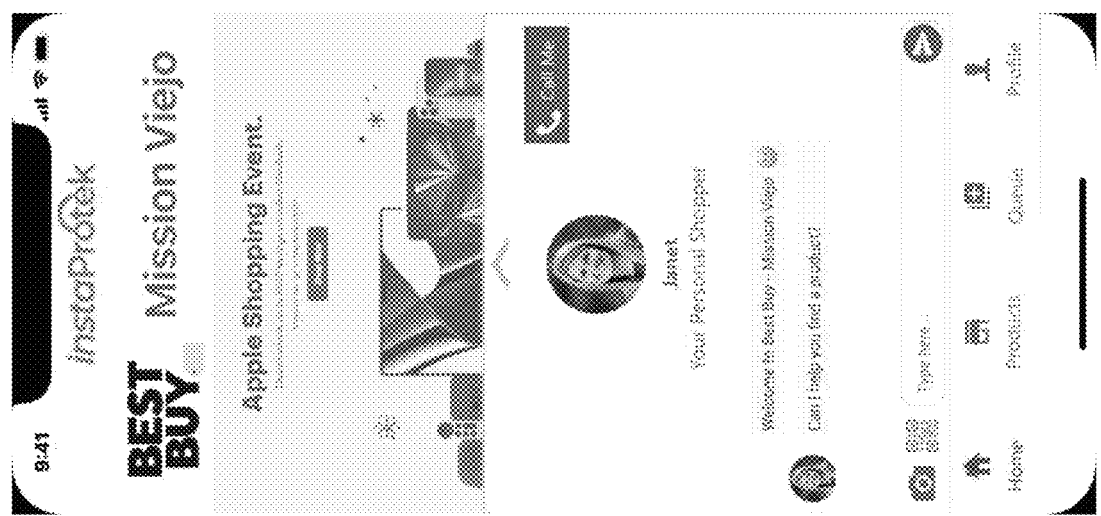
FIGS. 3A-3R illustrate example user interfaces.

Referring to FIG. 3A, in response to detecting that a user has arrived at an establishment (e.g., using GPS location data from the user's device or in response to a user device capturing, using a camera an image of a computer readable optical indicia located at the establishment, and/or the like), the illustrated query user interface may be presented via the user device. The user interface may include a field via which the user can enter an item query. For example, the query may be in the form of an item type (e.g., a phone) or an item type and brand name (e.g., Acme Phone). The user interface may include a control via which the user can communicate with a support person or bot (e.g., via a voice call, a video call, or text). The name and/or image of the support person may be displayed in association with a communication control.

Figure 3B:
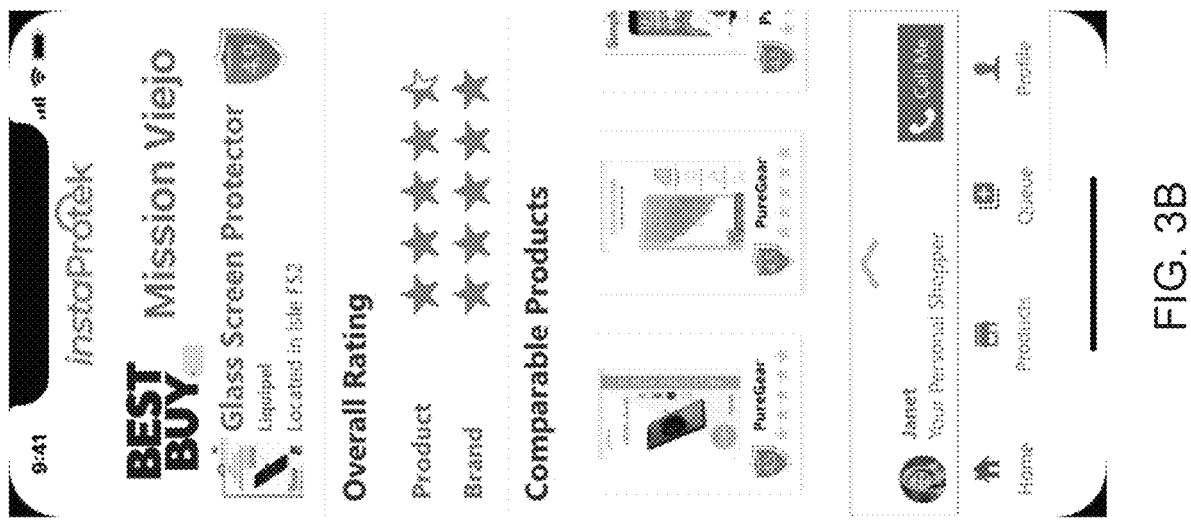

Referring to FIG. 3B, an example item detail user interface is illustrated. Optionally, the user interface may be presented on the user device in response to a user query or in response to a user selecting an item in search results provided in response to a user query. The example user interface may include an item name, an item brand, item location information (e.g., the aisle identifier, a location on the aisle, and/or a shelf number), rating information (e.g., a product rating, a brand rating, or types of ratings disclosed herein, etc.), and comparable/equivalent products. The name and/or image of the support person may be displayed in association with a communication control.

Figure 3C:
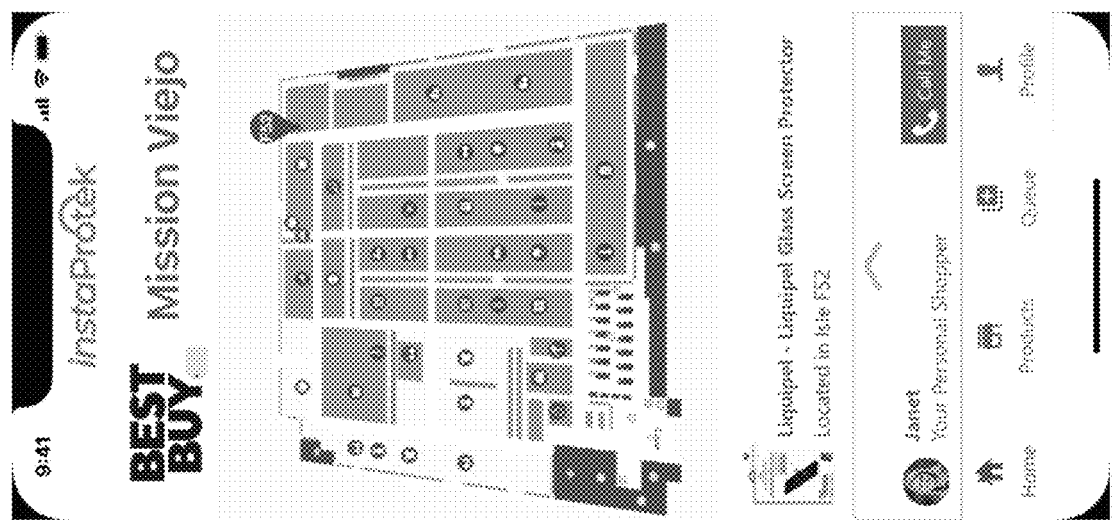

Referring to FIG. 3C, an example customer establishment navigation user interface is illustrated. The user interface may be presented in response to a user selecting a navigation control (which may be presented in association with an item detail user interface or otherwise). The user interface may include a layout map of at least a portion of the establishment, a path marked from the user's current position to a user-selected item, and an icon (e.g., a bubble or flag) and/or text identifying the location of the item on the map. In addition, text and one or more images may be presented that identify the item. The item location may also be provided textually (e.g., the aisle identifier, a location on the aisle, and/or a shelf number), displaced from the layout map. The name and/or image of the support person may be displayed in association with a communication control.

Figure 3D:
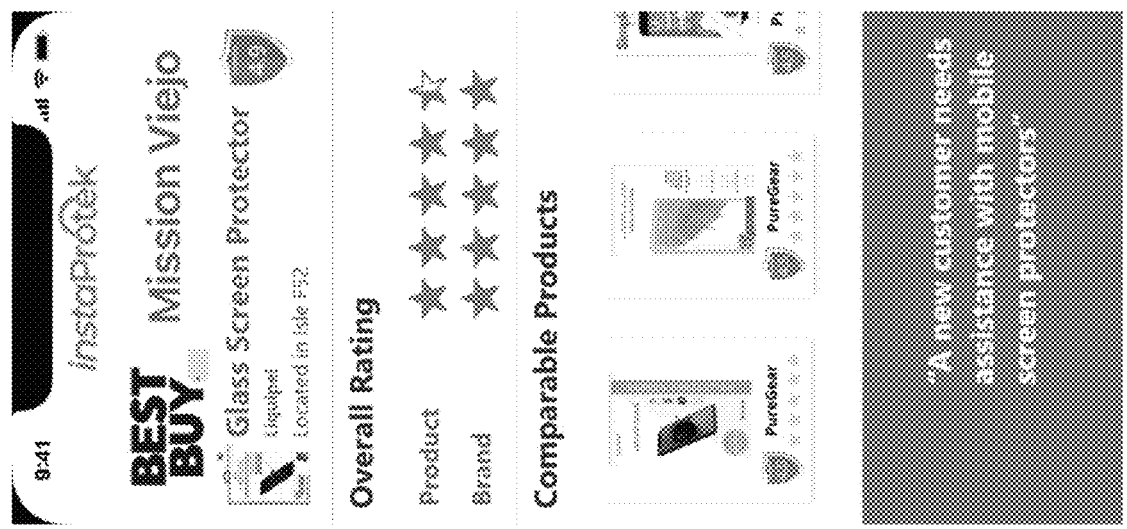

Referring to FIG. 3D an example help request notification user interface is illustrated. The user interface may be presented on a service person's user device in response to a user selecting a help request control (which may be presented in association with an item detail user interface or otherwise). The user interface may include text identifying the help request and the help request subject matter (e.g., if a user is requesting aid with respect to mobile device screen protectors, the text may recite "A customer needs assistance with mobile screen protectors"). Detailed information and analysis may be provided on one or more items that correspond to the user query. For example, the example user interface may include an item name, an item brand, item location information (e.g., the aisle identifier, a location on the aisle, and/or a shelf number), rating information (e.g., a product rating, a brand rating, or types of ratings disclosed herein, etc.), and an identification of comparable/equivalent products.

Figure 3E:
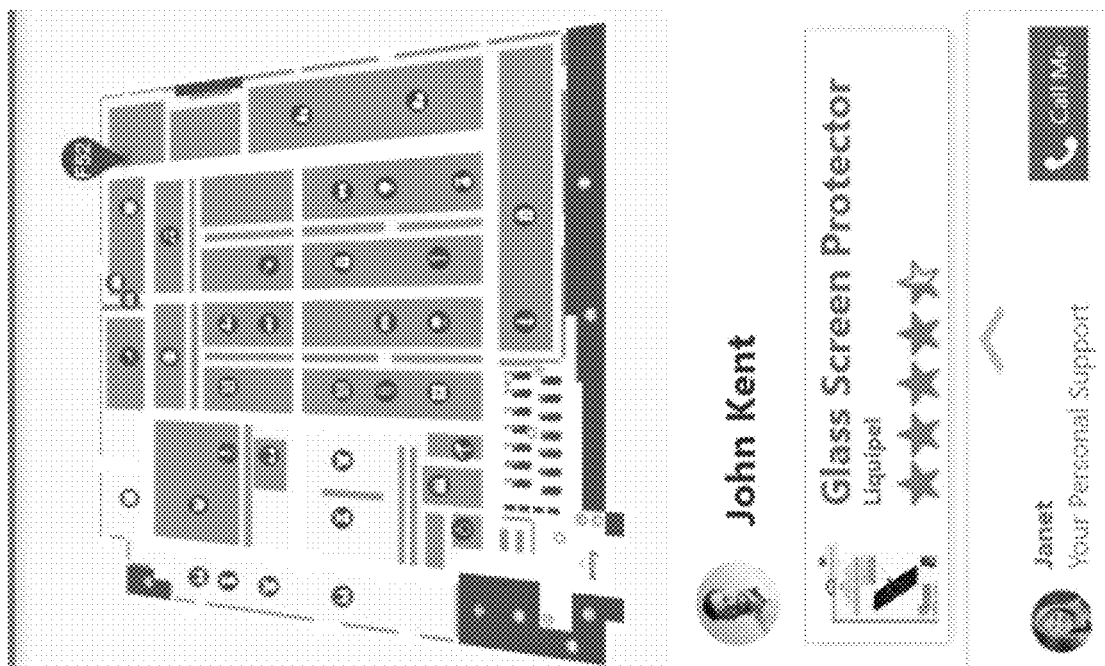

Referring to FIG. 3E, an example service person establishment navigation user interface is illustrated. The user interface may be presented in response to a service person receiving or accepting a user help request. The user interface may include a layout map of at least a portion of the establishment, a path marked from the service person's current position to the user or to the user-selected item, and an icon (e.g., a bubble or flag) identifying the location of the item or the user. In addition, text and one or more images may be presented, optionally displaced from the layout map, that identify the item and provide information on the item (e.g., an item rating or textual description of item features). The item location may also be provided textually (e.g., the aisle identifier, a location on the aisle, and/or a shelf number). The name and/or image of the support person and/or of the user may be displayed in association with a communication control.

Figure 3F:
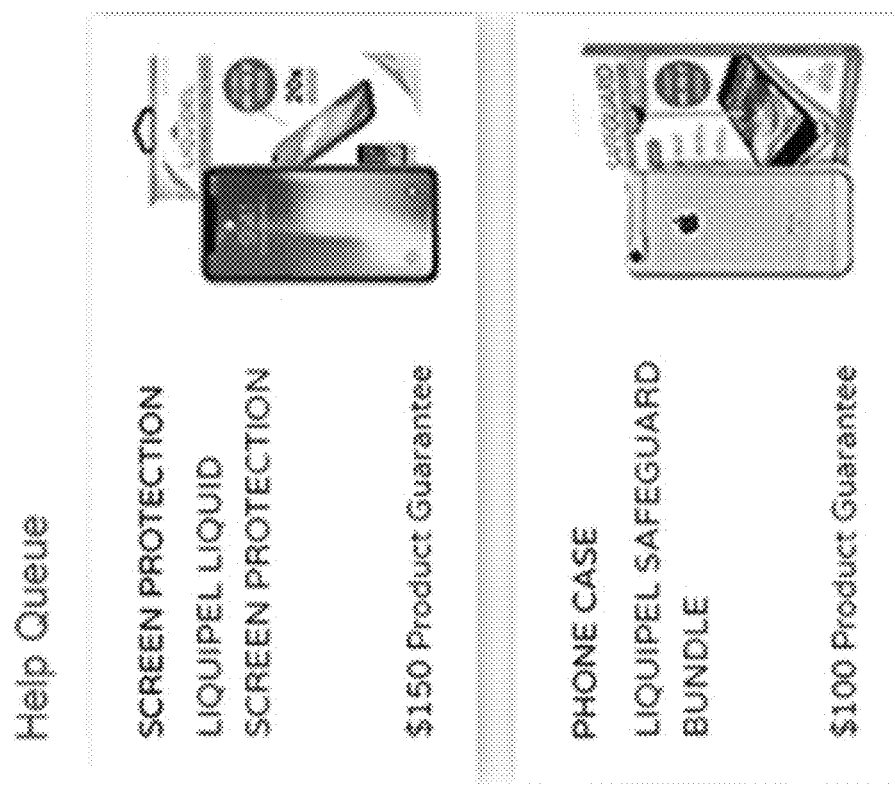

Referring to FIG. 3F, an example help queue user interface is illustrated. The user interface may be presented in response to a service person activating a queue request control. The queue may identify items for which users have requested assistance. The items may be identified by an item type description, a brand name, an item name, an item model number, an item cost, and/or an item image. A given item entry may also identify if there are any associated product guarantees and the amount of such guarantees. As each help request is serviced, the help request may be removed from the help queue in real time.

Figure 3G:
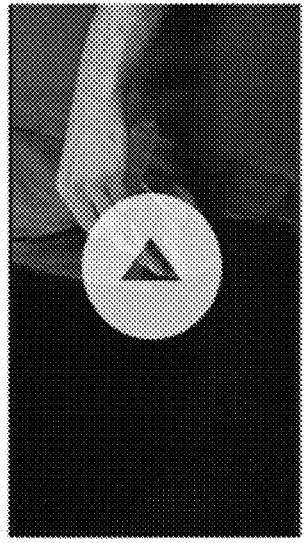
Figure 3G:
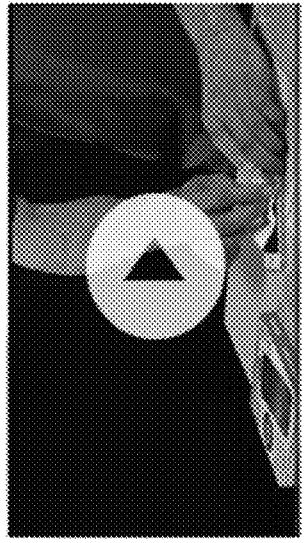
Figure 3G:

Referring to FIG. 3G, an example item usage interface is illustrated. In this example, the usage interface provides videos of various steps on the usage and application of an item. The user interface may be scrollable (e.g., via a swipe motion) to enable the user to access additional videos for additional steps. A given video may be displayed in association with a given step/sequence number and with a title/description as to the content of the given video.

Figure 3H:

Referring to FIG. 3H, an example user interface is illustrated displaying items that are compatible with or complementary to an acquired item are identified. Controls may be provided via which the user may acquire/purchase one or more of the compatible or complementary items.

Figure 3I:
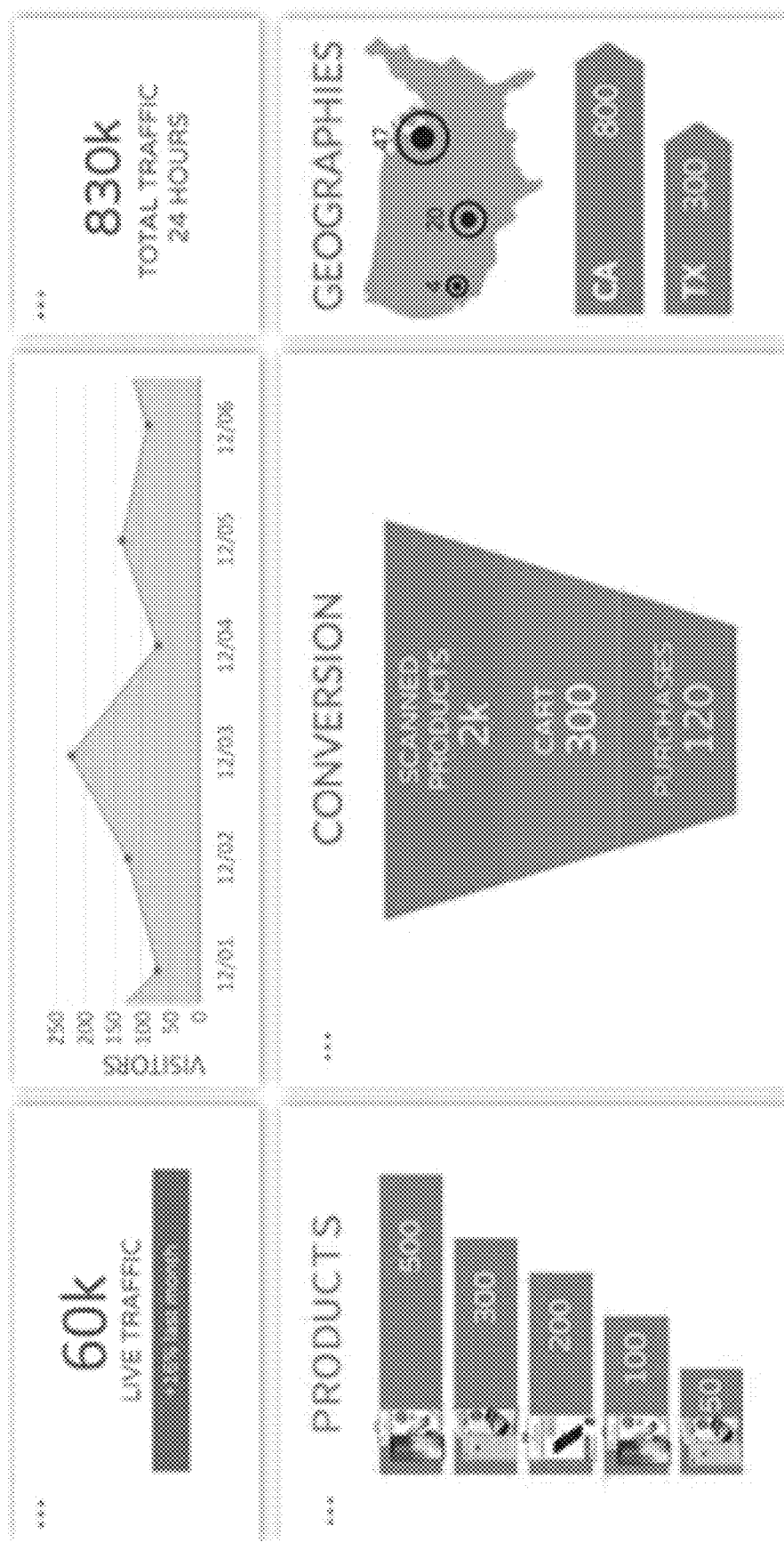

Referring to FIG. 3I, an example analytics user interface is illustrated. The analytics user interface may display, optionally in real time, how many consumers are in a given establishment or set of establishments, how many consumers in a given establishment or set of establishments are currently viewing or evaluating a given item, and/or conversion data (e.g., how many consumers have inquired regarding a given item/scanned an item optical indicia, how many consumers have placed the given item in an electronic shopping cart, how many of the given item have been purchased, etc.). The foregoing data may also be provided for a historical period of time (e.g., the past 24 hours, the past week, the past year, etc.). The foregoing data may be presented using a graph showing trends over a period of time. The foregoing data may be provided broken down by geographical region (e.g., by zip code, by city, by state, etc.). The analytics may be provided to one or more recipients (e.g., the establishment, the establishment chain, item distributors, item manufacturers, and/or other recipients) textually and/or graphically.

Figure 3J:
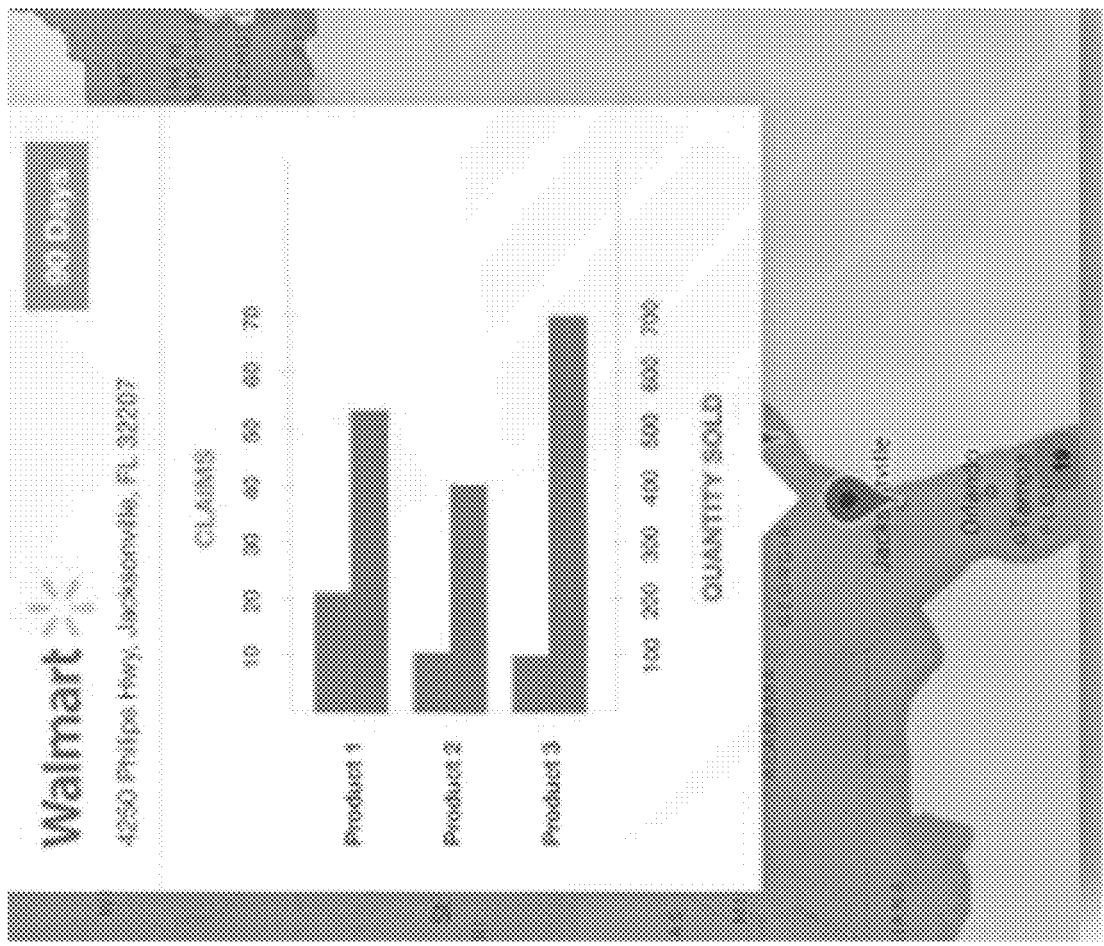

Referring to FIG. 3J, an example analytics user interface is illustrated. The analytics user interface of FIG. 3J may display, optionally in real time, a map including indicators for one or more stores. In response to a user selecting a given store (e.g., by touching a corresponding store indicator, hovering a cursor over the store indicator, clicking on the store indicator, etc.), a graph may be presented as an overlay indicating the number of user warranty claims and/or product guarantee claims for respective different products for number of products sold. Optionally, the period of time for which the data is displayed may be selected or otherwise specified.

Figure 3K:

Referring to FIG. 3K, another example analytics user interface is illustrated. The analytics user interface of FIG. 3K may display, optionally in real time, a map including indicators for one or more stores. In response to a user selecting a given store (e.g., by touching a corresponding store indicator, hovering a cursor over the store indicator, clicking on the store indicator, etc.), a graph may be presented as an overlay indicating the expenditure (e.g., in dollars) servicing user warranty claims and/or product guarantee claims for respective different products for number of products sold (where the number sold may be broken done by demographics of purchasers or claim submitters, such as by gender, age, etc.). Optionally, the period of time for which the data is displayed may be selected or otherwise specified.

Figure 3L:
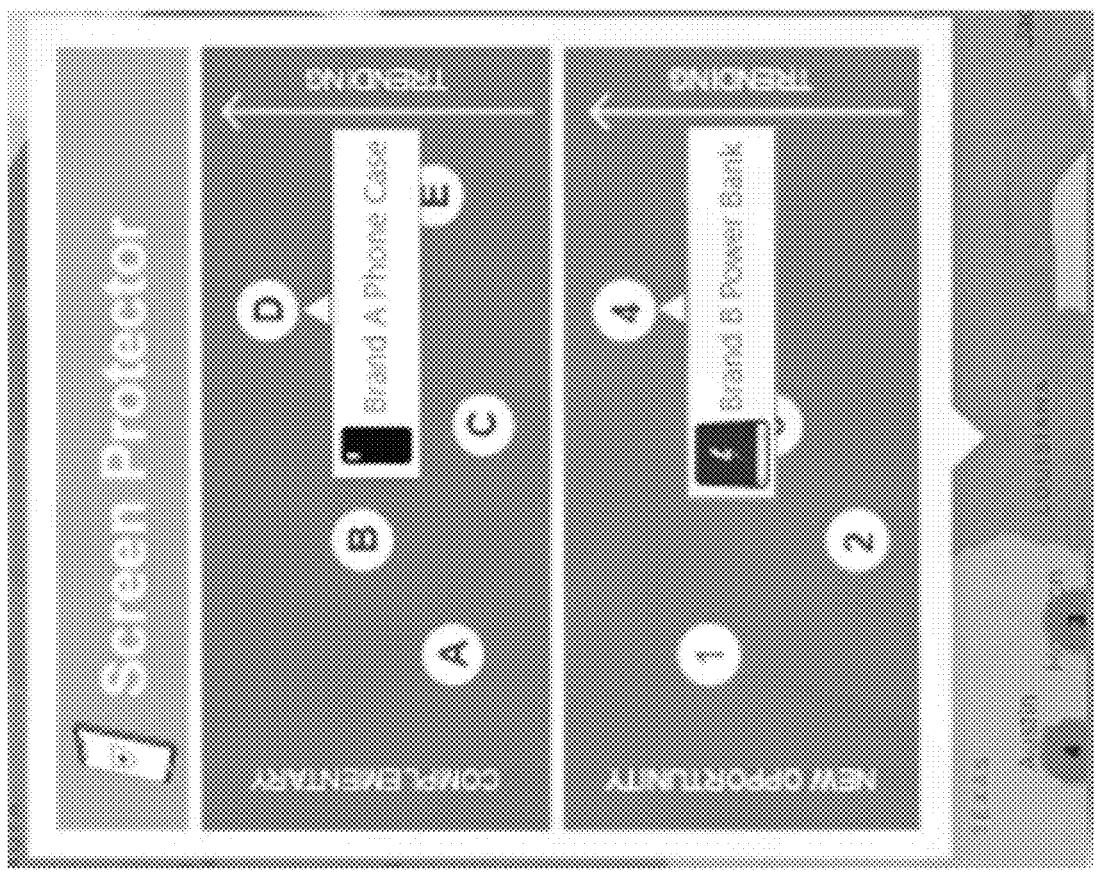

Referring to FIG. 3L, another example analytics user interface is illustrated. The analytics user interface of FIG. 3L may display, optionally in real time, a map including indicators for one or more stores. In response to a user selecting a given store (e.g., by touching a corresponding store indicator, hovering a cursor over the store indicator, clicking on the store indicator, etc.), a graph may be presented as an overlay indicating, for a selected product (e.g., a screen protector) trending complementary products and new opportunity products (where trending may be determined by a threshold number of sales, or the most popular (e.g., top 5, top 10, etc.) complementary products and new opportunity products). In response to a user selecting a given product indicator (e.g., by touching a corresponding product indicator, hovering a cursor over the product indicator, clicking on the product indicator), additional product information may be provided for the product.

Figure 3M:
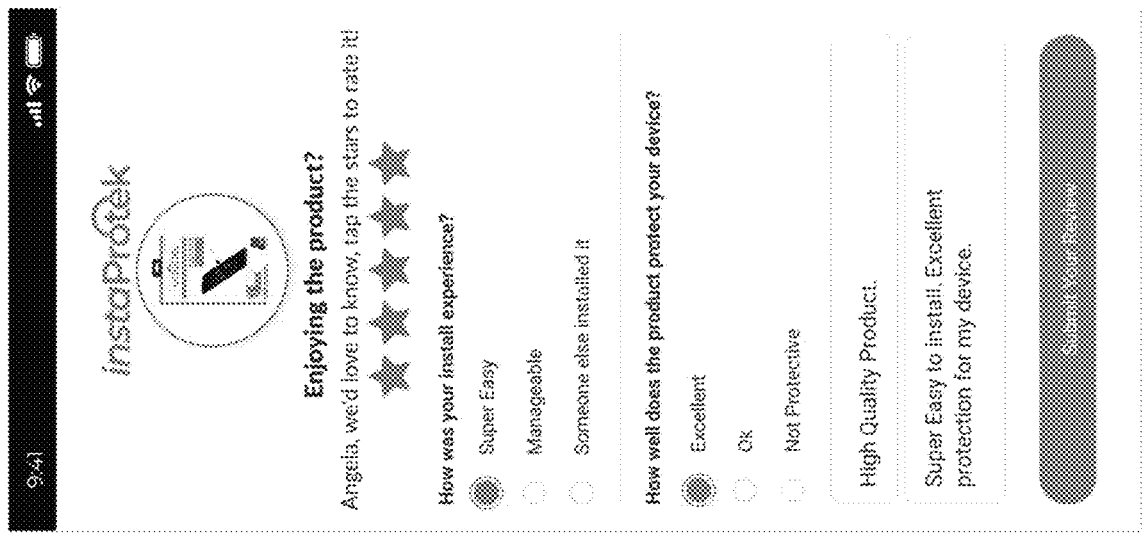

FIG. 3M illustrates an example feedback user interface. For example, the feedback user interface enables the user to rate an item (e.g., a product) as a whole (e.g., 1 to 5 stars) and various characteristics that are relevant to the item, such as, in the case of a screen protector, installation experience, how well the protector protects the device, etc. The rating of the characteristics may be performed by selecting amongst predefined choices. A learning engine may optionally convert the user's ratings and selections into a text description. The automatically generated text description may be used to prepopulate a review text field which the user may optionally be enabled to edit (e.g., delete, modify, or add text). A control is provided via which the user can submit the feedback.

Figure 3N:
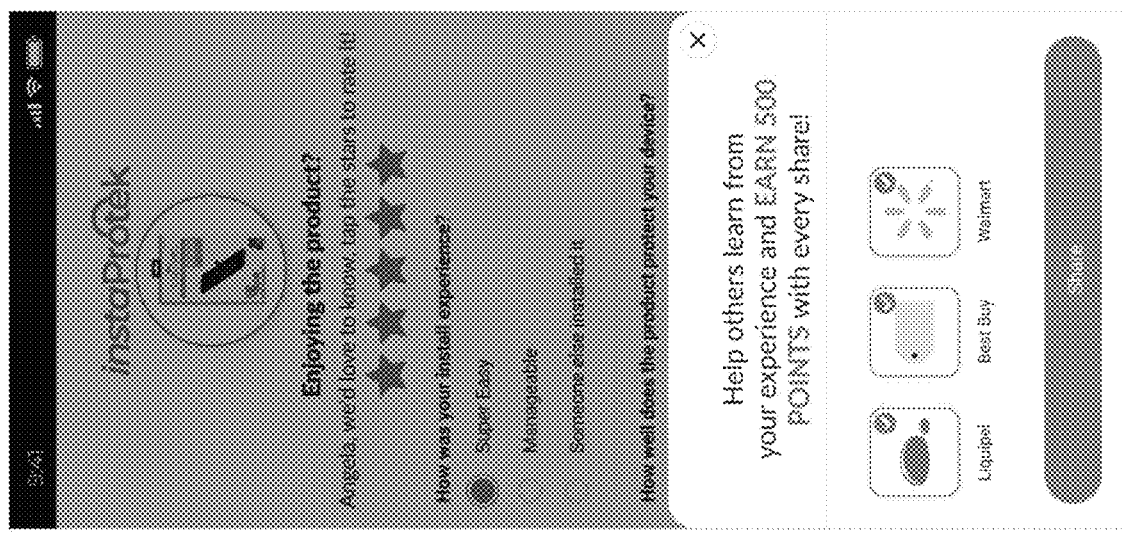
Figure 3O:
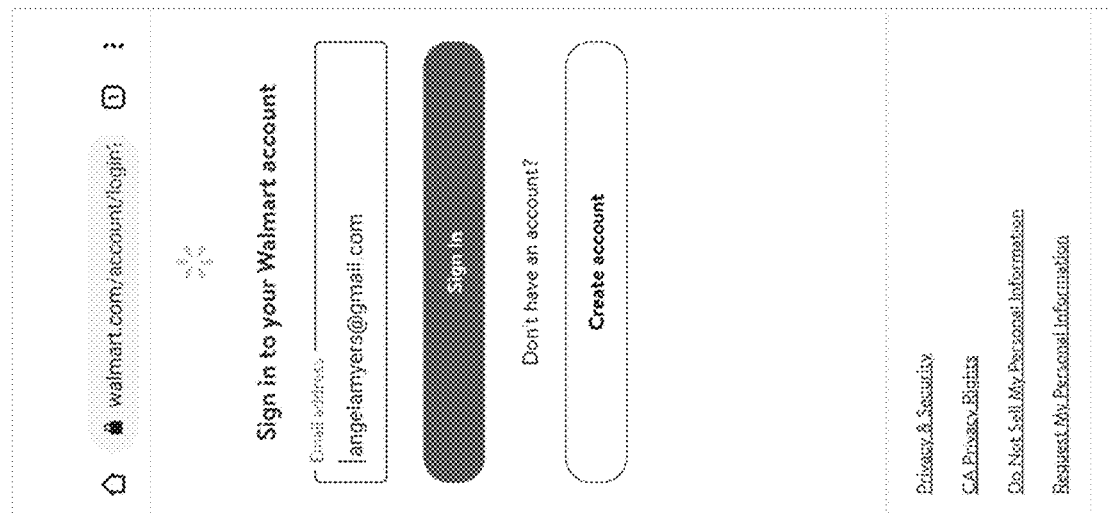
Figure 3P:
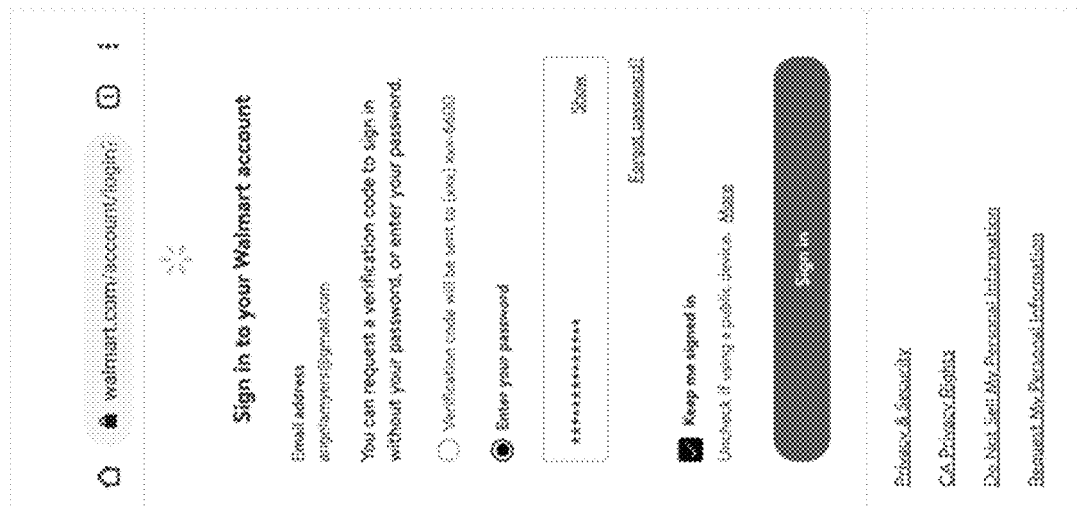
Figure 3Q:
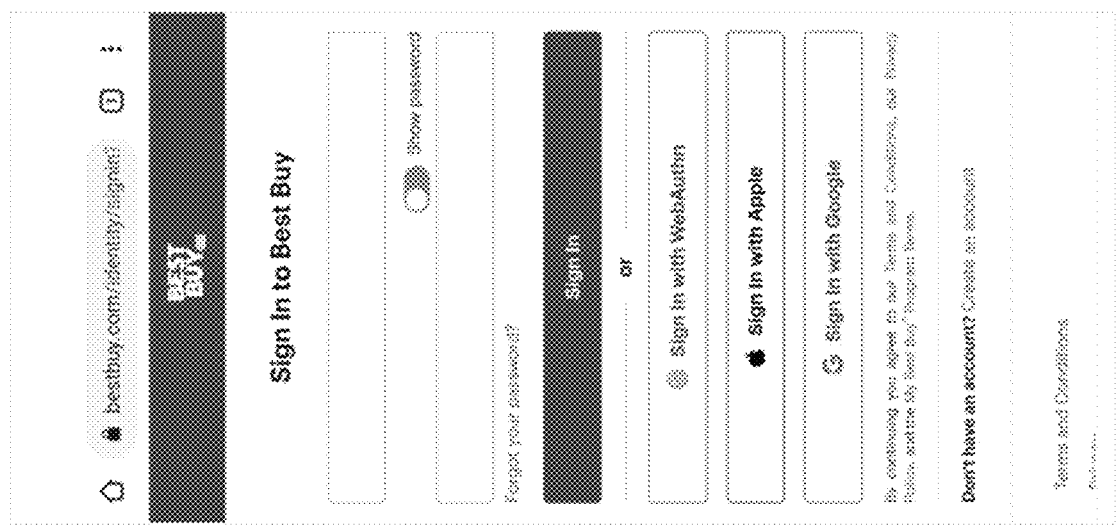
Figure 3R:
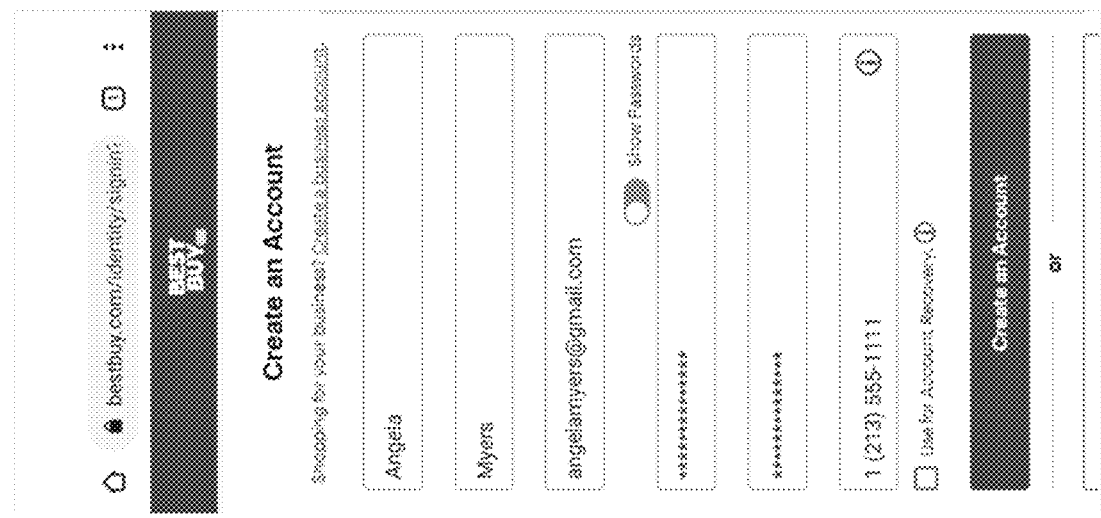

FIG. 3N illustrates an example feedback distribution user interface. The user interface presents several feedback distribution channels (e.g., ecommerce sites). The user can select one or more of the feedback distribution channels via which the user is willing to share the user's feedback (e.g., the feedback provided via the user interface illustrated in FIG. 3M).

Thus, among other aspects, a search and navigation system is described optionally comprising a learning engine that may be configured to analyze a user query regarding an item-type of interest to the user, identify suitable items of the item type, identify a physical structure in which one or more of the suitable items are present, navigate the user to the structure using turn-by-turn directions, and navigate the user to a location within the structure using turn-by-turn directions where one or more of the suitable items are positioned. The search and navigation system may be further configured to navigate another person to the user.

As discussed elsewhere herein, a user may wish to search for an item, such as a product or service. Conventionally, a user performing such a search may enter one or more search terms. A search engine may then attempt to identify relevant items by comparing the search terms to metadata associated with the item. Conventional product search systems often rely on metadata provided by manufacturers, which may be entered into Product Information Management Systems (PIMs) and published across various user-interactive platforms, such as e-commerce websites, distributor portals, and point-of-sale (POS) systems. However, these methods often result in inconsistent data sets across multiple manufacturers and may not encompass all the metadata that may be relevant to a user's item search. (e.g., metadata corresponding to features of interest to the user). In addition, the metadata may simply be erroneously applied.

Thus, due to the failure of conventional approaches to quickly search for and accurately identify relevant items, a user may need to perform a significant number of searches to identify a relevant item, where such multiple searches consume an inordinate amount of computer resources, such as processor, memory, and network resources. Consequently, there is a need for a more effective item search system.

Certain techniques are described that address the foregoing technical challenges by more quickly and accurately identifying relevant items to a user, thereby reducing the need for repeated searches, and hence reducing computer resource utilization.

An aspect of the present disclosure is an enhanced search engine that identifies relevant items based at least in part on user-generated item reviews and/or sentiment analysis.

Large language models (LLMs) may be employed to extract metadata from user reviews, analyze user sentiments, and provide an enhanced search experience. The described techniques enable users to search by any parameter specified in such reviews and may optionally rank metadata based at least in part on user sentiment. An aspect of the present disclosure relates to aggregating data around specific metadata to generate ratings and facilitate better-informed item selection.

Figure 4:
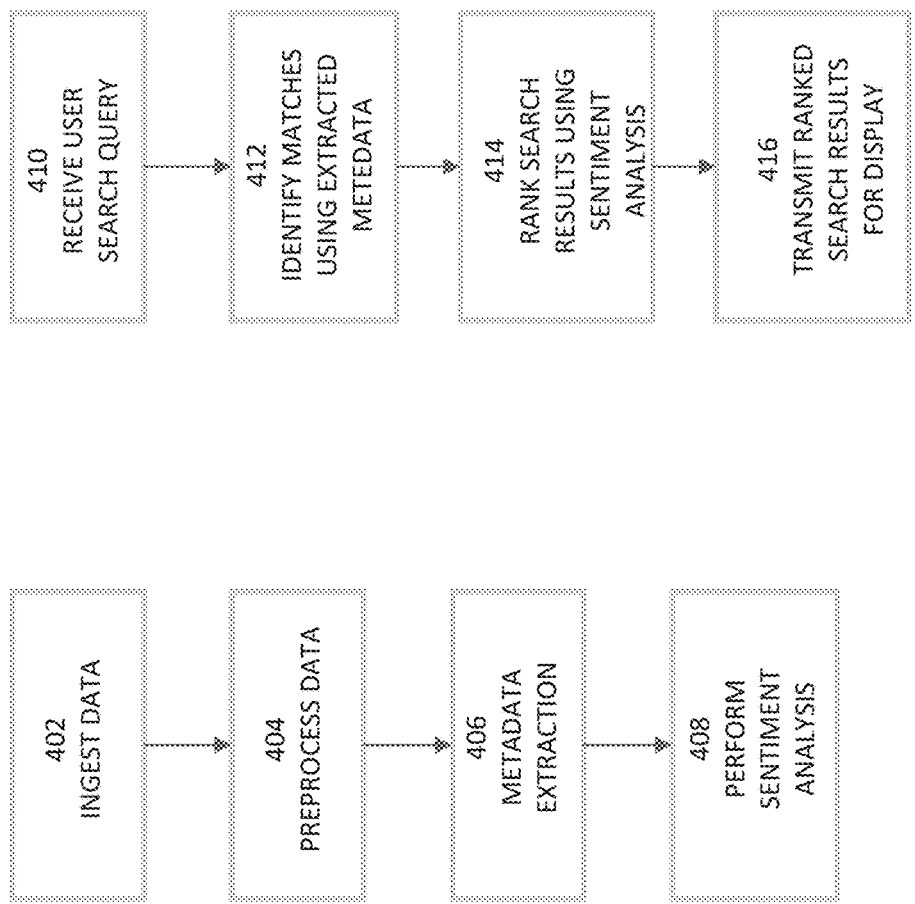
FIG. 4 illustrates an example process.

Referring now to FIG. 4, an example process is illustrated. It is understood that for clarity, the phrase "product" may be utilized herein, the process may be utilized for other items, such as services. As will be described, the content of user-generated reviews is accessed, processed using an artificial intelligence engine, such as one or more large language models, to extract item (e.g., product or service) metadata and user sentiment, which may then be published to user-facing platforms to enhance item search functionality. The system's AI, based on large language models (LLMs), processes user reviews to identify relevant metadata, quantify product attributes, and derive associated sentiment, making this information available for item search purposes.

At block 402, data collection is performed, where a dataset of user reviews, comprising review text, is collected. For example, user reviews may be collected by scraping ecommerce websites that have been posted reviews, review websites, using publicly available datasets, or collecting reviews from other sources. In addition, optionally the overall rating (e.g., a rating on the scale of 1 to 5 or a grade between A and F) of a given item assigned by a merchant or other entity based on an aggregation of user ratings (e.g., user ratings on the scale of 1 to 5 or user assigned grades between A and F) may be collected and used in generating the ratings discussed herein. Optionally, a helpfulness indication or other feedback assigned to a user review by other users may be utilized in determining whether or not metadata from the review should be utilized in determining a ranking or score of an item attribute or the item as a whole. For example, if a review has been rated as more unhelpful than helpful, optionally metadata from that review will not be used in ranking an item or item attribute, and optionally, such metadata from that review will not be used in a user search and discovery process. Thus, for example, feedback for a given item of content may be identified, and based at least in part on the identified feedback, a determination may be made as to whether metadata (and/or sentiment) analysis of the given item of content is to be used in ranking items identified in a user search.

At block 404, the collected review text may optionally be preprocessed. For example, the review text may undergo a data cleaning process, wherein irrelevant information, such as HTML tags, punctuation, and/or stopwords may be removed. The reviews may be tokenized into individual words or phrases to prepare them for analysis. For example, word tokenization: may be performed by splitting the text into individual words. Common delimiters, such as spaces or punctuation marks, may be used to determine word boundaries. In some cases, it may be beneficial to consider certain phrases or multi-word expressions as tokens instead of individual words. For example, "customer service" may be treated as single tokens to preserve their semantic meaning. Optionally, subword tokenization is performed where words are broken down into smaller subword units, such as morphemes or character sequences. Subword tokenization may be useful for handling out-of-vocabulary words. Once the reviews are tokenized, they can be further processed and analyzed using various NLP techniques, such as sentiment analysis or topic modeling as described herein.

At 406, a large language model may be used to analyze the reviews and extract relevant metadata and/or perform sentiment analysis. The relevant metadata may optionally include information such as the name or other identifier of the product or service being reviewed, the date of the review (e.g., a review creation date), the reviewer's location, features of the product being reviewed (such as example features described herein), and/or other details that are available in the review text and/or review images. The specific metadata to be extracted from the reviews may be defined. This could include information such as the product or service being reviewed, the date of the review, the reviewer's location, or any other relevant details.

For example, the language model may be used to extract the relevant information as follows. The preprocessed review text may be ingested by the large language model, and using techniques such as named entity recognition (NER) to identify entities such as product names, locations, or dates, and/or using part-of-speech (POS) tagging. to identify the grammatical structure of the text. The identified entities may be extracted from the parsed text. For example, if the language model identifies a product name, extract that specific portion of the review text as the product metadata. Additional metadata may be captures via the LLM's contextual understanding. By way of illustration, at block 408, optionally the surrounding text with respect to an identified product may be analyzed to determine the sentiment expressed in the review, identify specific features or aspects being discussed, or classify the overall sentiment towards the product or service.

The extracted metadata may optionally be cleaned and validated to better ensure accuracy. By way of example, rules or filters may be applied to handle cases where the large language model's output requires refinement or correction.

The LLM may be utilized to apply sentiment analysis techniques to determine the sentiment expressed in a given item review. Optionally, a given review may be classified into positive, negative, or neutral categories and/or by assigning a sentiment score to a given review. Aggregation may optionally be performed to accumulate data related to specific metadata and ratings may be generated for products or product aspects (e.g., functionality, design, reliability, etc.) based at least in part on user sentiment.

Optionally, the LLM may be refined to enhance its performance using the collected item reviews and their associated metadata to improve the accuracy of sentiment analysis. For example, the LLM may be trained on the specific task of sentiment analysis using labeled data. Optionally, the performance of the sentiment analysis model may be evaluated by comparing the predicted sentiments with the ground truth labels if available. If the sentiment analysis in insufficiently accurate, the model may be further trained using labeled data.

At block 410, a search query is received from a user device via a user interface. The search query may include one or more words or phrases.

At block 412, a search is performed using a search engine where some or all of the user query is compared to the extracted metadata from the user reviews of products (and optionally other metadata, such as that assigned by a manufacturer or ecommerce site) to identify products that match the query.

At block 414, the search results corresponding to matching products are ranked based at least in part on the closeness of the match and/or on the user sentiment regarding the matching products. Optionally, an overall rating for specific metadata may be generated using the collective sentiment of user reviews regarding products and/or product attributes.

At block 416, the search results may be transmitted to the user device for presentation in ranked order and/or with ranking indications (e.g., a number indicating the rank). The search results may comprise images of the corresponding products, selected excerpts from corresponding user item reviews, sentiment values, and/or other data disclosed herein.

By way of illustrative example, if a user submits a review of an electric bike detailing its battery attributes (e.g., the biking range the battery provides, the charging time, the size, the reliability, the ease of removal and installation, etc.), the trained LLM may be used to analyze the review, extract metadata related to the battery, and quantify its characteristics based on user sentiment. Optionally, the system can aggregate data surrounding specific metadata, such as battery quality in this example, and generate a rating for that attribute. If a threshold percentage (e.g., greater than 50% or other threshold percentage) rate a particular aspect of a product positively, the LLM may identify that aspect and/or the product as high-scoring and prioritize that product over others during search results. For example, the searching results may include one or more entries, ranked based on the respective calculated scores, where the search results present the products in ranked order and/or other ranking indication (e.g., a ranking number presented in conjunction with a given product).

Thus, an aspect of the present disclosure relates to an enhanced search system that utilizes a search data store comprising metadata extracted from user item reviews.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone/mobile device application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A search system configured to perform searches in response to user queries, the system comprising:
    a network interface;
    at least one processing device operable to perform operations comprising:
        access a plurality of items of content comprising text related to one or more items;
        access helpfulness data with respect to respective items plurality of items of content and based at least in part on the accessed helpfulness data determine whether at least a portion of the items plurality of items of content are to be excluded from sentiment analysis;
        tokenize the text of at least a portion of the plurality of items of content related to one or more items, wherein certain portions of the text are split into individual words as respective tokens, and at least one multi-word expression is maintained as a single token thereby preserving its semantic meaning;
        utilize a large language model to extract metadata from at least a portion of the tokenized plurality of items of content related to one or more items, wherein a performance of the large language model is improved by training the large language model on a specific task of sentiment analysis using labeled data;
        perform sentiment analysis to determine user sentiment regarding respective item attributes and/or items;
        assign respective values to one or more of a given item's attributes based at least in part on the determined user sentiment;
        receive a handshaking message from a client on a first user device that identifies a cipher suite supported by the client and that includes a string configured to be used in generating an encryption key;
        generate a key configured to be used in encrypting messages between the system and the first user device;
        respond to the client with a handshaking signal which identifies the cipher suite suit and encryption version to be used;
        receive, via the network interface over a network from a first user device, associated with a first user, a first query;
        enhance a search functionality by:
            perform a search for items satisfying the first query using the extracted metadata;
            rank items identified in the search based at least in part on respective values, the values based at least in part on the determined user sentiment, assigned to respective attributes associated with the items; and
            transmit over the network, using the network interface, ranked search results, to the user device, the ranked search results corresponding at least in part to the item and/or item attribute rankings, wherein the ranked search results are displayed via the user device.

2. The system as defined in claim 1, the operations further comprising:
    aggregating data related to specific metadata;
    determining sentiment information using the aggregated data;
    generating rating data for item attributes corresponding to the specific metadata using the sentiment information.

3. The system as defined in claim 1, wherein the large language model comprises one or more hidden layers and one or more pooling layers.

4. The system as defined in claim 1, wherein the one or more items comprise respective products.

5. The system as defined in claim 1, the operations further comprising identifying feedback for a given item of content, and based at least in part on the identified feedback, determine whether metadata and/or sentiment analysis from the given item of content is to be used in ranking items identified in the search.

6. The system as defined in claim 1, wherein the plurality of items of content related to one or more items comprises user item reviews and/or an aggregate rating based on the item reviews.

7. The system as defined in claim 1, wherein prior to utilizing the large language model to extract metadata from the plurality of items of content related to one or more items, a data cleaning process is performed on the plurality of items of content to remove HTML tags, punctuation, and/or stopwords.

8. The system as defined in claim 1, wherein the ranked search results comprise images of the corresponding items, selected excerpts from corresponding user content, and/or sentiment values.

9. The system as defined in claim 1, wherein the extracted metadata comprises respective identifiers associated with respective items, respective content creation dates, and respective item features.

10. The system as defined in claim 1, the operations further comprising:
    scraping at least a portion of the items of content from a plurality of websites and/or databases.

11. A search system configured to perform searches in response to user queries, the system comprising:
    a network interface;
    at least one processing device operable to perform operations comprising:
        access a plurality of items of content comprising text related to one or more items;
        access helpfulness data with respect to respective items plurality of items of content and based at least in part on the accessed helpfulness data determine whether at least a portion of the items plurality of items of content are to be excluded from sentiment analysis;
        tokenize the text of at least a portion of the plurality of items of content related to one or more items, wherein certain portions of the text are split into individual words as respective tokens, and at least one multi-word expression is maintained as a single token thereby preserving its semantic meaning;
        utilize a large language model to extract metadata from at least a portion of the tokenized plurality of items of content related to one or more items, wherein a performance of the large language model is improved by training the large language model on a specific task of sentiment analysis using labeled data;

perform sentiment analysis to determine user sentiment regarding respective item attributes and/or items;

assign respective values to one or more of a given item's attributes based at least in part on the determined user sentiment;

receive a handshaking message from a client on a first user device that identifies a cipher suite supported by the client and that includes a string configured to be used in generating an encryption key;

generate a key configured to be used in encrypting messages between the system and the first user device;

respond to the client with a handshaking signal which identifies the cipher suite suit and encryption version to be used;

receive, via the network interface over a network from a first user device, associated with a first user, a first query;

enhance a search functionality by:

perform a search for items satisfying the first query using the extracted metadata;

rank items identified in the search based at least in part on respective values, the values based at least in part on the determined user sentiment, assigned to respective attributes associated with the items; and transmit over the network, using the network interface, ranked search results, to the user device, the ranked search results corresponding at least in part to the item and/or item attribute rankings, wherein the ranked search results are displayed via the user device;

receive a selection of a first item in the search results;

determine a location of the first item;

determine a first location of the first user;

cause a first navigation route to be generated from the first location of the first user to the location of the first item; and cause the first navigation route from the first location of the first user to the location of the first item to be transmitted to and displayed by the first user device in association with a map.

12. The system as defined in claim 11, the operations further comprising:
aggregating data related to specific metadata;
determining sentiment information using the aggregated data;
generating rating data for item attributes corresponding to the specific metadata using the sentiment information.

13. The system as defined in claim 11, wherein the large language model comprises one or more hidden layers and one or more pooling layers.

14. The system as defined in claim 11, wherein the one or more items comprise respective products.

15. The system as defined in claim 11, the operations further comprising identifying feedback for a given item of content, and based at least in part on the identified feedback, determine whether metadata and/or sentiment analysis from the given item of content is to be used in ranking items identified in the search.

16. The system as defined in claim 11, wherein the plurality of items of content related to one or more items comprises user item reviews and/or an aggregate rating based on the item reviews.

17. The system as defined in claim 11, wherein prior to utilizing the large language model to extract metadata from the plurality of items of content related to one or more items, a data cleaning process is performed on the plurality of items of content to remove HTML tags, punctuation, and/or stopwords.

18. The system as defined in claim 11, wherein the ranked search results comprise images of the corresponding items, selected excerpts from corresponding user content, and/or sentiment values.

19. The system as defined in claim 11, wherein the extracted metadata comprises respective identifiers associated with respective items, respective content creation dates, and respective item features.

20. The system as defined in claim 11, the operations further comprising:
scraping at least a portion of the items of content from a plurality of websites and/or databases.

* * * * *